United States Patent [19]
Fukushima et al.

[11] Patent Number: 5,812,279
[45] Date of Patent: Sep. 22, 1998

[54] FACSIMILE MACHINE CAPABLE OF EFFICIENT TRANSMISSION PROCESSING

[75] Inventors: Shigenobu Fukushima, Yao; Hideo Muramatsu, Shinshiro, both of Japan

[73] Assignee: Minolta Co., Ltd., Osaka, Japan

[21] Appl. No.: 787,931

[22] Filed: Nov. 5, 1991

[30] Foreign Application Priority Data

Nov. 10, 1990 [JP] Japan ................................ 2-305094
Nov. 10, 1990 [JP] Japan ................................ 2-305095

[51] Int. Cl.⁶ ........................... H04N 1/00; H04N 1/32
[52] U.S. Cl. .................... 358/404; 358/437; 358/444; 358/456
[58] Field of Search ................... 358/400, 404, 358/405, 407, 444, 462, 457, 456, 486, 437, 436, 438, 439

[56] References Cited

U.S. PATENT DOCUMENTS

| | | | |
|---|---|---|---|
| 4,494,149 | 1/1985 | Furukawa | 358/404 |
| 4,667,251 | 5/1987 | Hasegawa | 358/457 |
| 4,695,895 | 9/1987 | Nagashima | 358/426 |
| 4,712,139 | 12/1987 | Kato | 358/439 |
| 4,862,282 | 8/1989 | Nakajima | 358/400 |
| 4,907,094 | 3/1990 | Mishima et al. | 358/404 |
| 4,922,349 | 5/1990 | Abe et al. | 358/400 |
| 4,955,066 | 9/1990 | Notenboom | 358/261.1 |
| 4,975,786 | 12/1990 | Katayama et al. | 358/457 |
| 5,073,827 | 12/1991 | Nakajima | 358/400 |
| 5,099,335 | 3/1992 | Kato | 358/444 |
| 5,177,620 | 1/1993 | Fukushima | 358/400 |

FOREIGN PATENT DOCUMENTS

| | | |
|---|---|---|
| 62-136171 | 6/1987 | Japan . |
| 62-52507 | 11/1987 | Japan . |
| 62-285574 | 12/1987 | Japan . |

OTHER PUBLICATIONS

Canon "Fax–L770" Instruction Book, pp. 1, 44–49, 86, 87 and 90–95, 1990.

*Primary Examiner*—Kim Yen Vu
*Assistant Examiner*—Kimberly A. Williams
*Attorney, Agent, or Firm*—Sidley & Austin

[57] ABSTRACT

A facsimile machine in accordance with the present invention includes a reading device for reading an original image to be transmitted, a memory for storing the read image data, a first transmission device for transmitting the image data stored in the memory to an external device, a second transmission device for transmitting the read image data to an external device in parallel with the reading operation by the reading device, and a controller for activating one of the first and second transmission devices based on the remaining amount of the storage capacity of the memory.

27 Claims, 22 Drawing Sheets

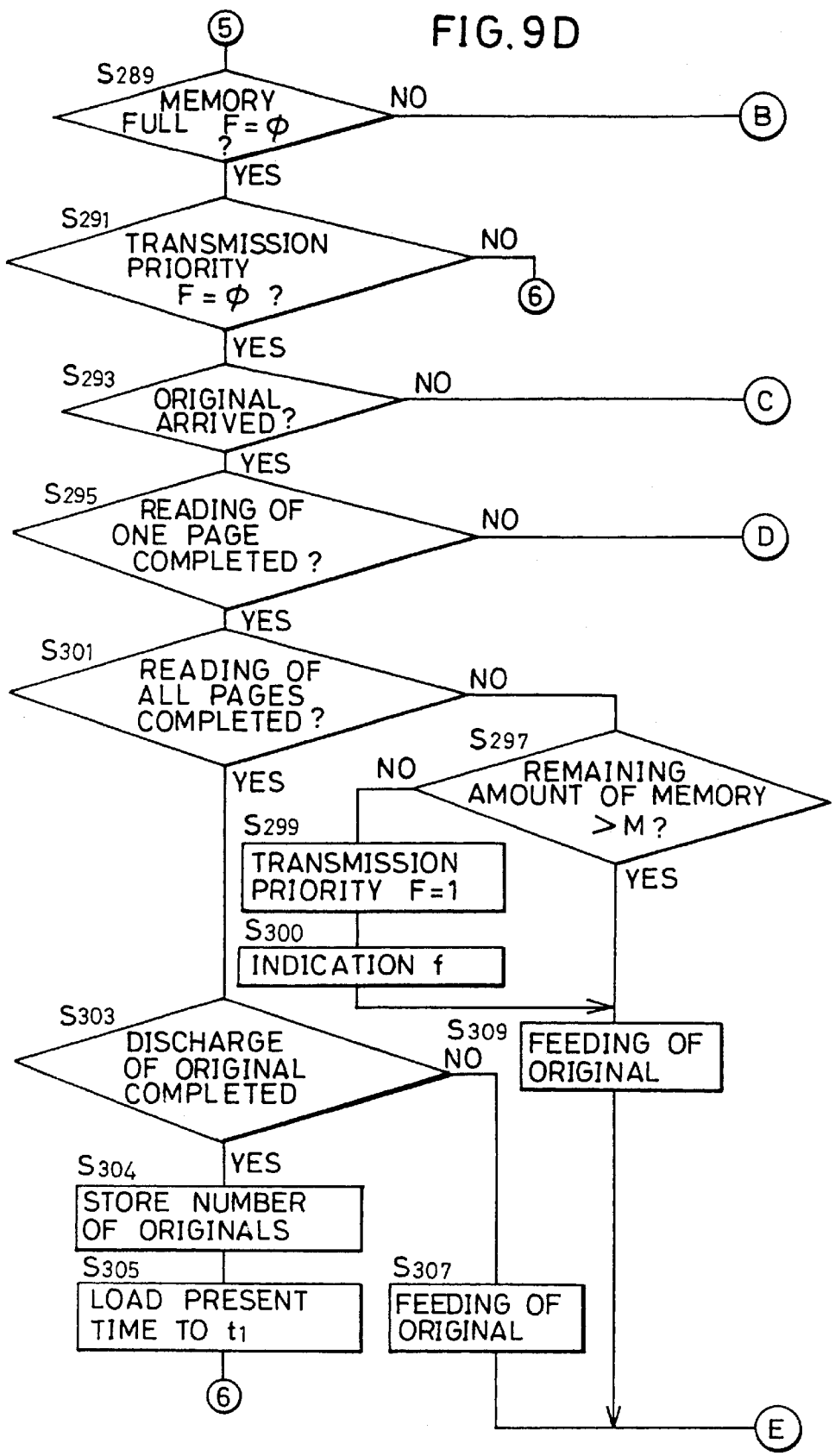

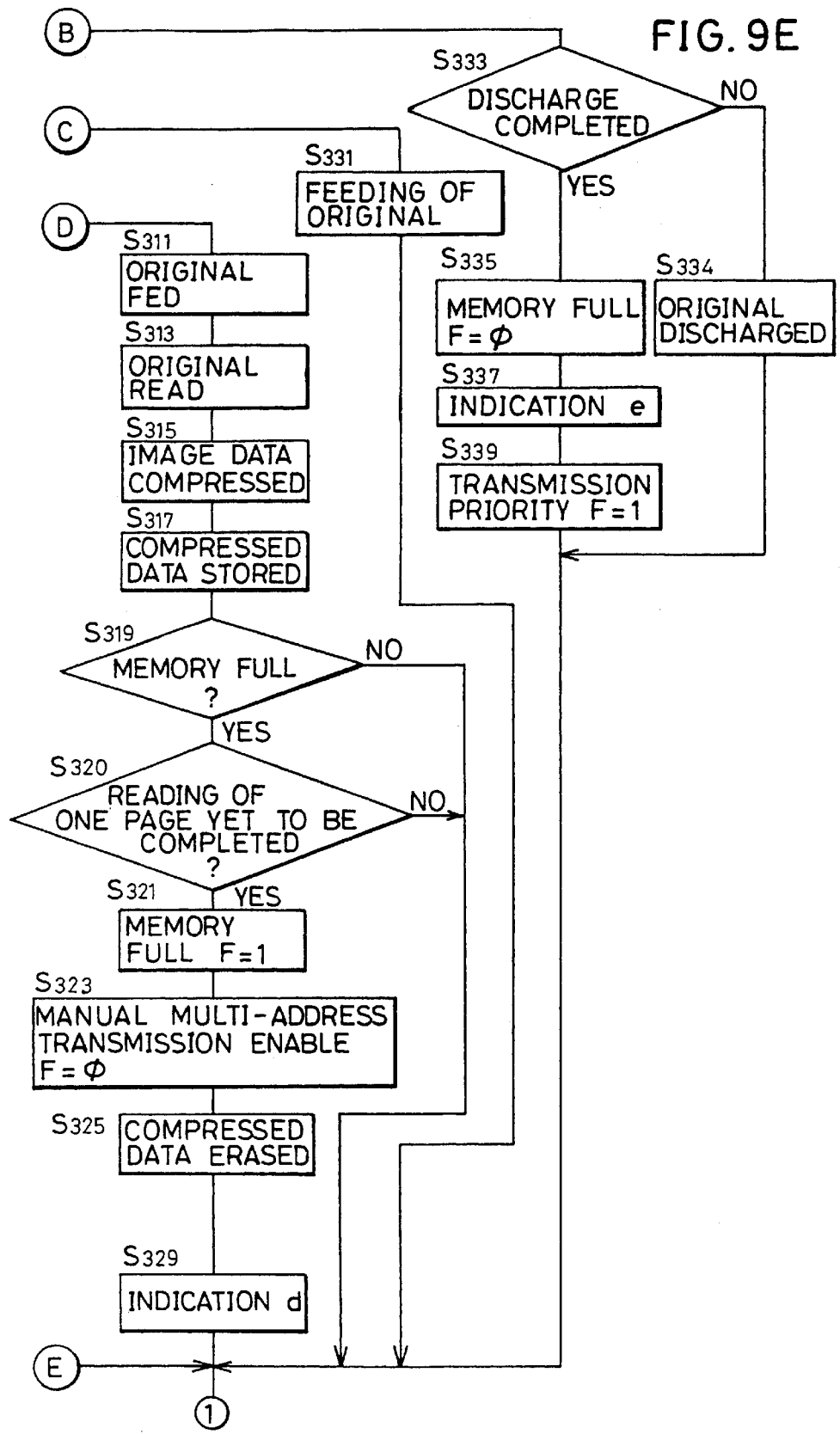

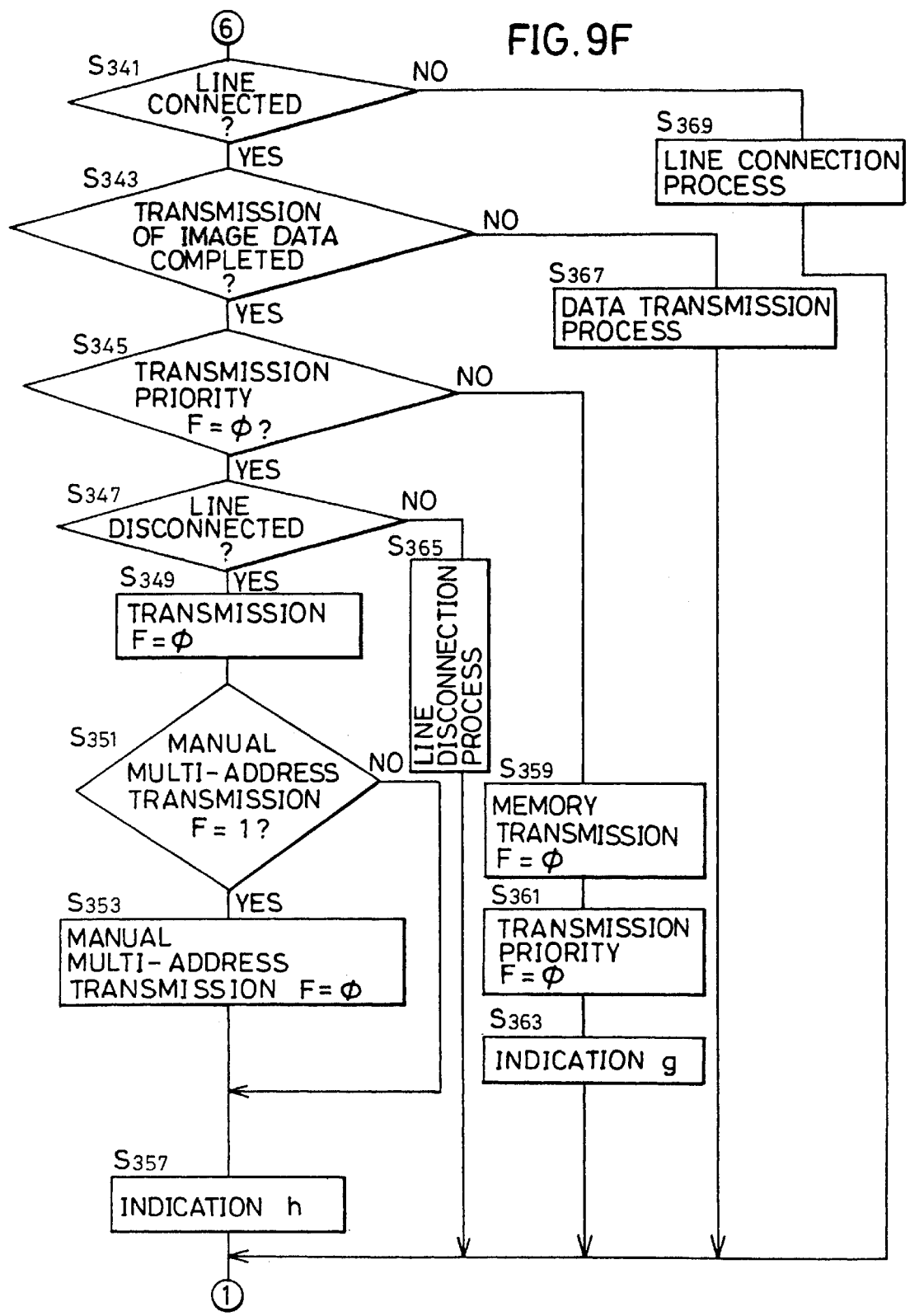

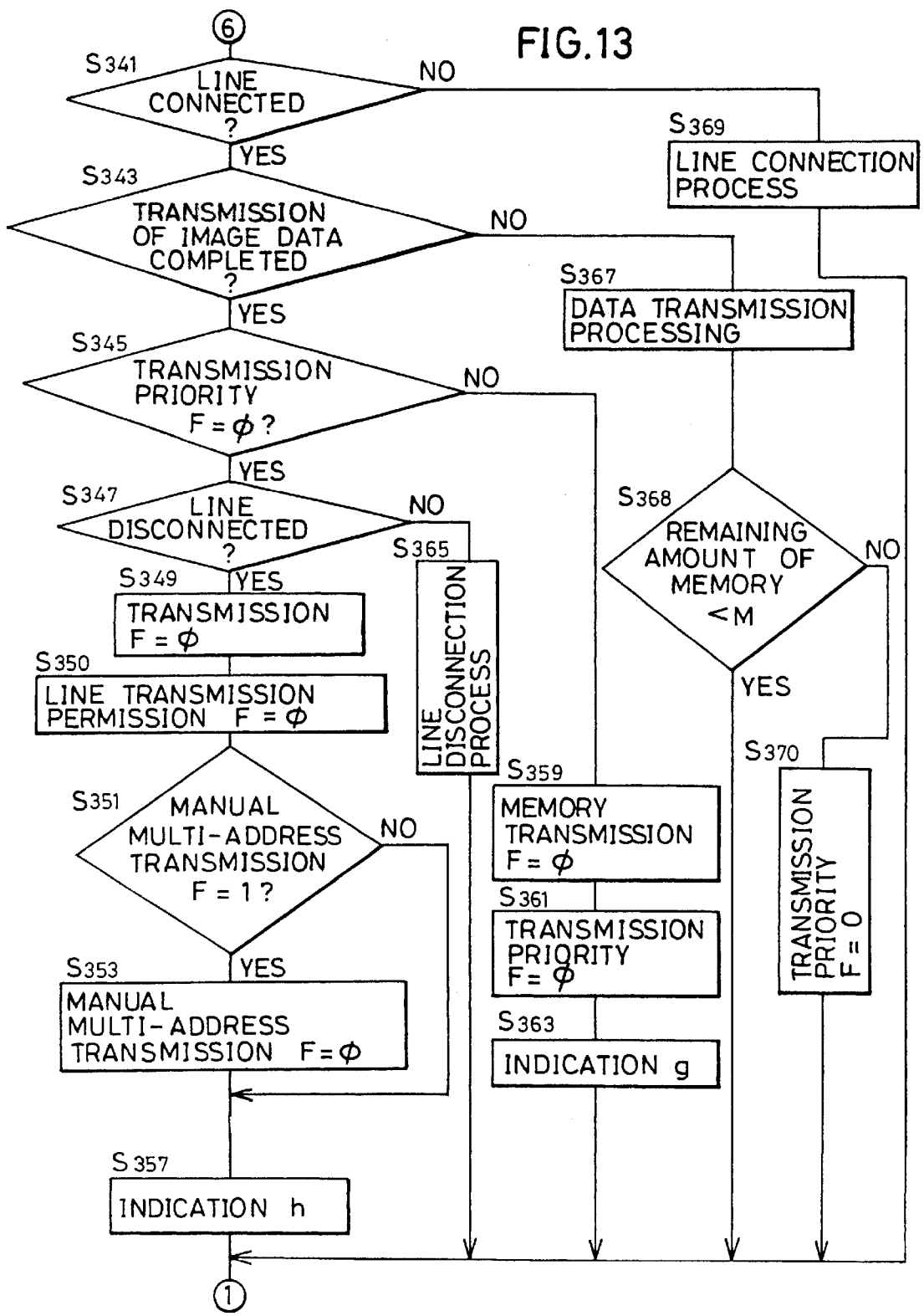

FACSIMILE MACHINE CAPABLE OF EFFICIENT TRANSMISSION PROCESSING

BACKGROUND OF THE INVENTION

1. Field of the Invention

The present invention relates generally to a facsimile machine, and more specifically, to a facsimile machine capable of storing read image data and transmitting based on the read image data.

2. Description of the Related Art

In recent years, facsimile machines as disclosed in Japanese Patent Publication No. 62-52507 have been developed, which can store read image data for the purpose of multi-address transmission and rendering the machine easier to handle.

A facsimile machine is disclosed in Japanese Patent Laying-Open No. 62-136171, which can automatically stop and resume reading depending upon the storage capacity of the storage portion.

Also disclosed in Japanese Patent Laying-Open No. 62-285574 is a facsimile machine capable of estimating the amount of image data to be subsequently read based on already read image data and restricting the vacant space of the storage device from running out during its storing operation.

The above-described conventional facsimile machines are far from satisfactory in terms of easiness in handling.

The machine disclosed in Japanese Patent Laying Open No. 62-136171 transmits stored image information when the vacant space of memory for storing read original images runs out and thereafter stores read image data in the vacant space in the memory created due to the transmission of the image information. However, it is necessary to alternately perform re-compression of the image data stored in the memory and compression of the read data when the compression format of the data stored in the memory is different from the compression format accepted by the machine on the receiving side, and writing and reading of images to and from the memory should also be performed alternately, thereby increasing time required for communication.

Japanese Patent Laying-Open No. 62-285574 discloses the estimation of storage capacity overflow, but the measure taken by the machine upon estimation of storage overflow is just giving an alarm, which is not sufficient as a practical measure.

SUMMARY OF THE INVENTION

It is therefore an object of the present invention to use a memory efficiently in a facsimile machine.

Another object of the present invention is to increase reliability in use of a memory in a facsimile machine.

Yet another object of the present invention is to perform high speed transmission operation using a memory in a facsimile machine.

In order to achieve the above-described objects, a facsimile machine in accordance with an aspect of the present invention includes reading means for reading an original to be transmitted, storage means for storing the read image data, first transmission means for transmitting the stored image data to an external device after completion of the reading operation by the reading means, second transmission means for transmitting the read image data to an external device in parallel with the reading operation by the reading means, and control means for activating either the first or second transmission means based on the remaining amount of the storage capacity of the storage means.

In a facsimile machine structured as described above, efficient use of the storage means can be achieved because the transmission means is selectively activated based on the remaining amount of the storage capacity of the storage means.

In order to achieve the above-described objects, a facsimile machine in accordance with another aspect of the present invention includes reading means for sequentially reading a plurality of original images to be transmitted, storage means for storing the read image data, detection means for detecting that the remaining amount of the storage capacity of the storage means is below a prescribed value, first transmission means for transmitting the stored image data to an external device in response to the detection output from the detection means, and second transmission means for transmitting image data corresponding to original images yet to be transmitted without using the storage means after the transmission of the stored image data by the first transmission means.

A facsimile machine structured as described above transmits stored image data when the storage capacity of the storage means is below a prescribed value, and then transmits image data corresponding to original images yet to be transmitted without using the storage means. High speed transmission processing can therefore be achieved without memory overflow taking place.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 9A to 9F are flow charts each showing the specific contents of the transmission routine shown in FIG. 7;

FIG. 13 is a flow chart showing the embodiment shown in FIG. 11, corresponding to FIG. 9F showing the former embodiment;

DESCRIPTION OF THE PREFERRED EMBODIMENTS

Figure 1:
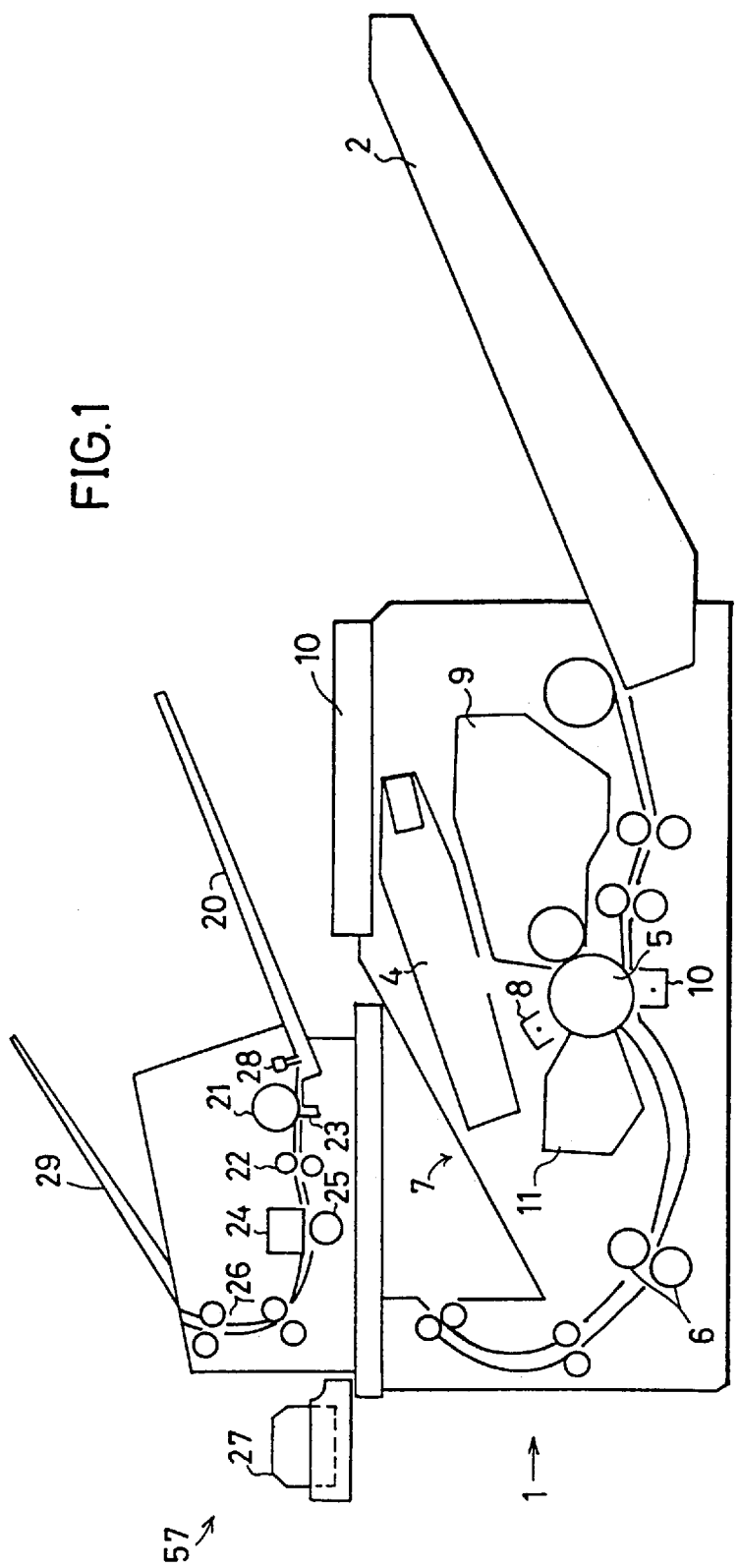
FIG. 1 is a sectional view showing a facsimile machine in accordance with an embodiment of the present invention.

FIG. 1 is a sectional view showing a facsimile machine in accordance with one embodiment of the present invention.

The facsimile machine is largely divided into a storage portion 1 and a reading portion 57. Storage portion 1 is specifically a laser beam printer, the operation of which will be briefly described in the following.

A photoreceptor drum 5 is charged by a charger 8, and an electrostatic latent image is formed by optics 4. Toner of a developing unit 9 sticks to this image. Cut paper is set to a feed paper cassette 2, and is fed one by one through rollers.

Toner sticking to photoreceptor drum 5 is transferred onto a sheet of paper by a transfer charger 10, and is discharged onto a tray 7 after being fixed by a fixing device 6. Toner which does not stick is collected by a cleaner 11, thus completing one cycle of printing.

Now, description will be provided on the operation of reading portion 57.

Originals set in original tray 20 are detected by a sensor 28, and have their ends lifted to a prescribed position by a lifting plate 23. Then, the originals are prepared and fed sequentially from the top. A fed original is transported by rollers 22, 25 and 26, read by an image sensor 24, of close contact type, as a digital image, and is finally discharged onto a discharge tray 29.

A hand set 27 for interface with communication lines is provided in the reading portion 57. An operation panel 10 for setting various operation modes of transmission/reception is disposed under original tray 20.

Figure 2:
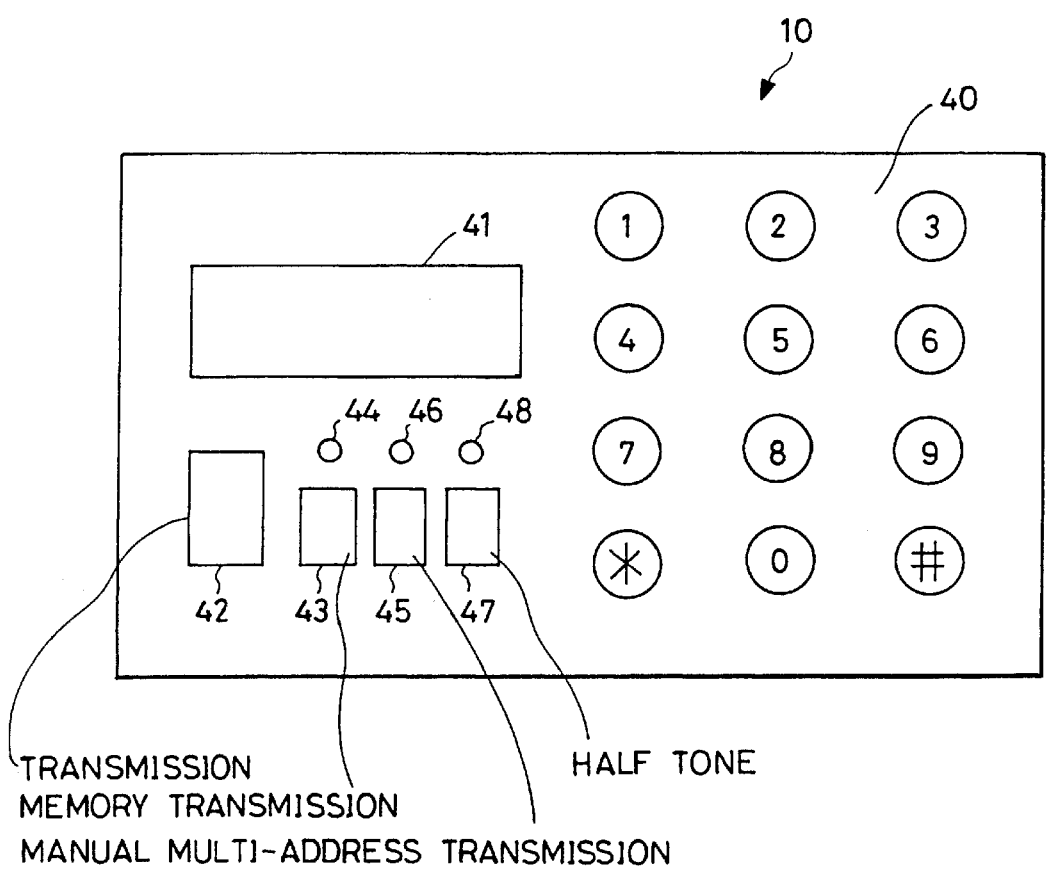
FIG. 2 is a top plan view showing the operation panel of the facsimile machine shown in FIG. 1.

FIG. 2 is a top plan view showing the operation panel 10 of the facsimile machine of FIG. 1.

The operation panel 10 includes a ten key group 40, a liquid crystal panel 41, operation keys 42, 43, 45 and 47, and LEDs (Light Emitting Diodes) 44, 46 and 48.

Ten key group 40 is used for inputting telephone numbers (or dial numbers) of a party to which an image is to be transmitted. Liquid crystal panel 41 is used for indicating the operational state of the facsimile machine or displaying instructions to an operator. Key 42 is used for initiating transmission operations of the facsimile machine. Key 43 is for selecting a memory transmission mode and LED 44 indicates such selection.

Key 45 is for selecting manual multi-address transmission, LED 46 indicates that manual multi-address transmission is going on or manual multi-address transmission can be conducted. The manual multi-address transmission will be described later.

Half tone key 47 is for selecting a half tone reading process mode, and LED 48 indicates such selection.

Figure 3:
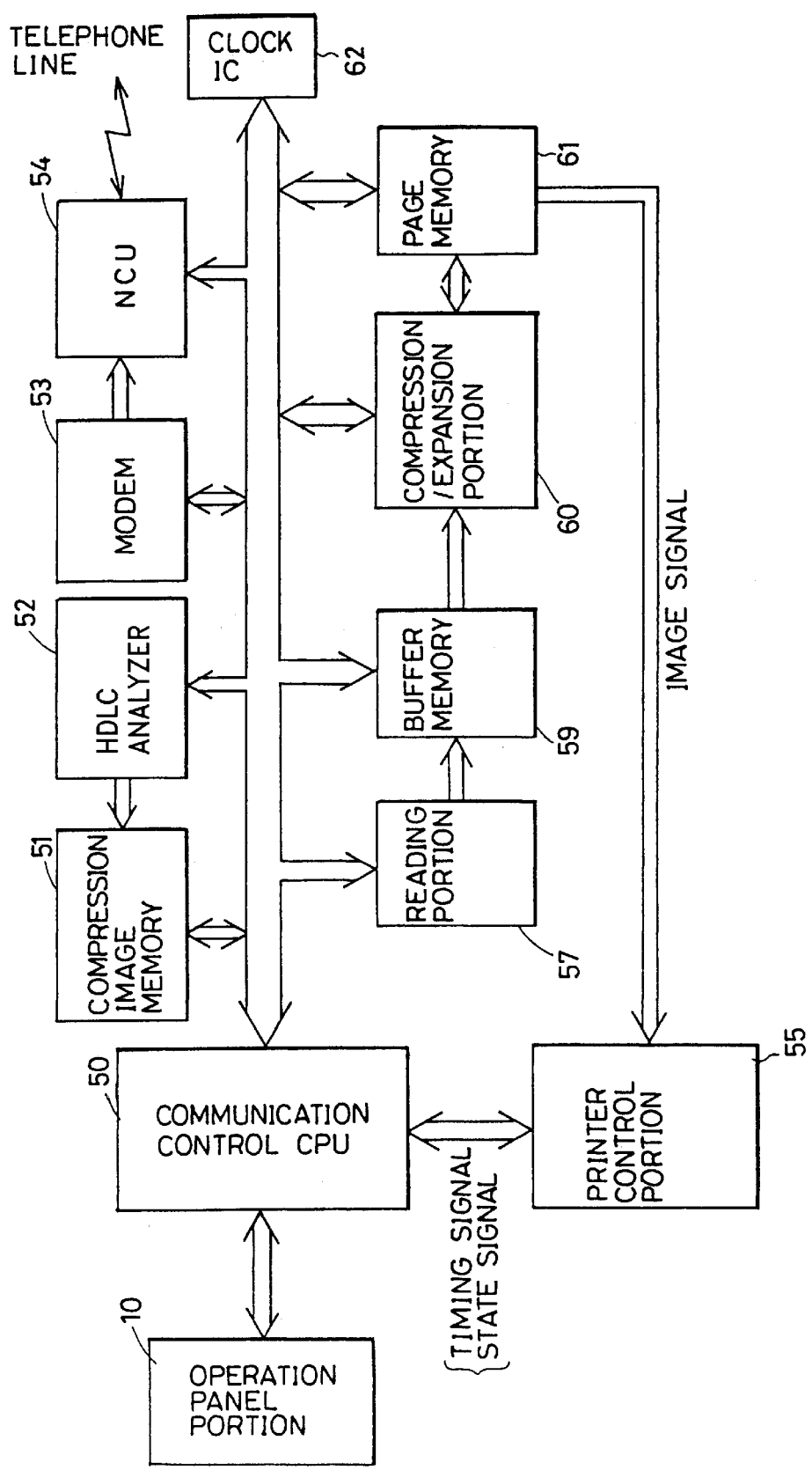
FIG. 3 is a block diagram showing the control portion of a facsimile machine in accordance with the embodiment of the present invention.

FIG. 3 shows a control portion of a facsimile machine in accordance with one embodiment of the present invention.

The control portion is substantially formed of a communication control CPU 50, an operation panel 10, a printer controller 55, a communication path and a timing signal path for transmitting information and connecting these devices. The operation of these devices will be described in accordance with the operation of the facsimile machine.

Transmission operations will be described. Transmission operations include: (1) memory transmissions, and (2) non-memory transmissions, each of which will be described in the following.

(1) Transmission using a memory (hereinafter referred to as "memory transmission".)

An original is placed on original tray 20. The placement of the original is detected by the sensor 28 of reading portion 57, and this information is transmitted to CPU 50. CPU 50 causes the display of a request for the input of a facsimile telephone number to be indicated on the display 41 of operation panel 10. In response to the input of a receiving facsimile telephone number, an image signal for every 1 line of the original is obtained by transportation of the original through reading portion 57 and reading the original simultaneously, with image sensor 24, and the 1 line data is transmitted to a buffer memory 59.

At that time, the image data in buffer memory 59 is compressed by a compression/expansion portion 60 and stored in a compression image memory 51.

After completion of reading and storing operations, CPU 50 calls the facsimile device (FAX) on the receiving side through a telephone line via an NCU (Network Control Unit) 54. With the telephone line being connected thereto, the compressed data stored in compression image memory 51 is transmitted to compression/expansion portion 60 and expanded, and stored as actual image data in a page memory 61. Then, the data undergoes automatic reduction in accordance with the size of the recording paper used on the receiving side FAX. After being recompressed at compression/expansion portion 60 in accordance with the coding format of the receiving side FAX, the data is stored once again into another memory area of compression image memory 51 as compressed image data.

These expansion and compression operations are conducted alternately by one block unit of several lines.

Thus, obtained compression data is processed in accordance with HDLC (High Level Data Link Control) specification by an HDLC analyzer 52, and transmitted to the telephone line by a modem 53 and NCU 54. With all the image data having been transmitted, the device is disconnected from the telephone line in accordance with a disconnecting procedure, thus completing the transmission operation.

(2) Transmission without a memory (hereinafter referred to as "non-memory transmission")

The operation as far as the input of a FAX number after an original is placed on original tray 20 is the same as the above-stated memory transmission. Thereafter, a dial number is dialed, and the image data is read, using the image sensor 24 and rollers of reading portion 57, after being connected to a telephone line. The read data is stored in buffer memory 59. At that time, the data is converted into compression data in accordance with the read recording size and compression format of the receiving side FAX. The converted data is transmitted to the telephone line, using HDLC analyzer 52, modem 53 and NCU 54 through compression image memory 51.

The basic operation at the time of reception is generally well known, and will therefore be only briefly touched upon.

Upon calling through a telephone line and the establishment of a line connection, incoming compression image data is expanded at compression/expansion portion 60 and is stored into page memory 61 as actual image data. At that time, the image signal is transmitted to a printer control portion 55, and recording is conducted in synchronization with the mechanical control of the printer. The recording operation is completed by repeating this operation a necessary number of times.

Description will be provided on manual multi-address transmission.

Today, the multi-address calling function, or "program transmission" as used generally in the field of facsimile machines is conducted by setting a plurality of destinations (dial numbers), and transmitting an original image to the plurality of destinations sequentially.

In contrast, for manual multi-address transmission, in accordance with the present invention, a dial number is entered with respect to an already transmitted original, and transmission can be made to the destination of the dial number without reading the original again.

This produces the following advantages over general multi-address transmission devices:

(1) Addition and change of destinations to which information is transmitted can be made easily.
(2) The other party to which information is simultaneously transmitted does not have to be set in the first place, and, therefore, appropriate response can be made with respect to transmission mistakes, etc. from time to time.
(3) The operation is easily handled because initial set-up is not necessary in the case of a single multi-address transmission.

As for usual transmissions, if the same original is transmitted to two destinations, for example, reading of the original for the second time can be omitted, thereby advantageously alleviating labor by the operator.

Figure 4:
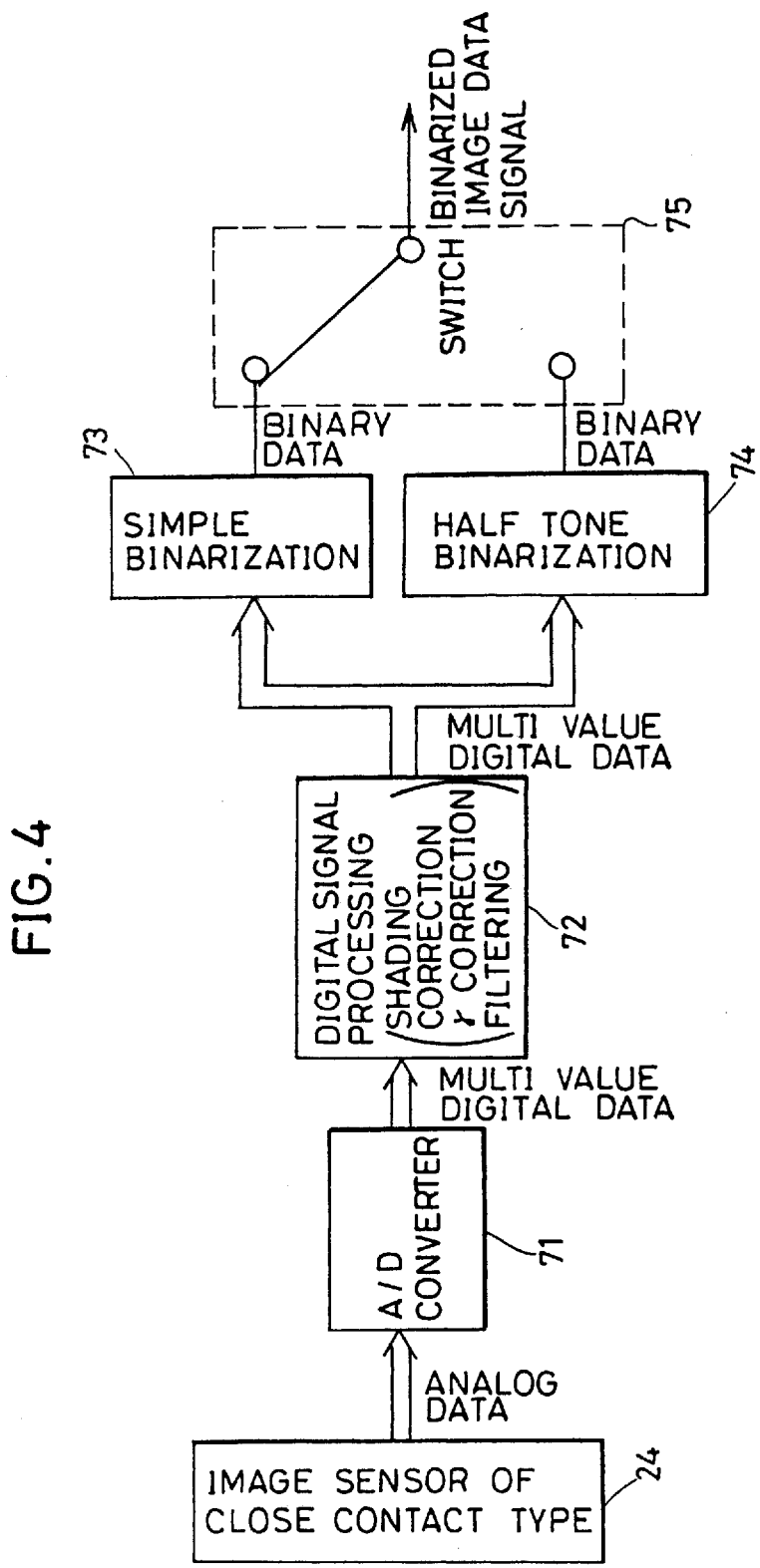
FIG. 4 is a block diagram showing a flowchart for the binarization selection process included in the reading portion shown in FIG. 3.

FIG. 4 is a block diagram showing the inside of reading portion 57, and showing the flow of an image analog signal from image sensor 24 to its binarization and conversion into a signal.

Analog data, an output from close contact type image sensor 24, is converted into digital data of several bits by an A/D converter 71. Then, the digital data is subject to various corrto various corrections (such as shading correction, γ correction and filtering)at a digital signal processing portion 72. The output value is transmitted to binarization portions 73 and 74.

Simple binarization portion 73 conducts a simple binarization, suitable for a non-half tone image, based on a threshold value. Half tone binarization portion 74 deals with binarization by dither processing. Hereinafter, the former processing mode is referred to as binary mode, and the latter processing mode is as half tone mode. As for half tone binarization portion 74, binarization such as by means of error dispersion, other than dither processing, is possible.

A switch 75 is for selecting the output of either binarization portion 73 or 74, the output of half tone binarization portion 74 is selected when the half tone mode is selected, and the output of simple binarization portion 73 is selected at the time of non-selection.

A digital image generally obtained by the half tone binarization portion 74, by means of areal gradation, tends to be inferior in the continuity of pixels as compared to an image obtained by simple binarization. Especially, in order to provide an image of color grey, the image is transformed into a dotted pattern, thereby providing an apparent image of grey. Therefore, when the digital image is compressed, the capacity of compression data is tremendously increased in the half tone mode as compared to the binary mode. This is because normal compression methods (MH, MR, MMR, etc.) are directed to a non-half tone image such as an original image of characters.

Although in this embodiment, the half tone image is transmitted after being subject to binarization at half tone binarization portion 74, multi-valued data output from digital signal processing portion 72 may be transmitted as it is, or transmitted after being subject to processing by a multi-value dither method. In the above-described case, the amount of data is avoidably increased as compared to the case in which the simple binarization is conducted.

Figure 6:
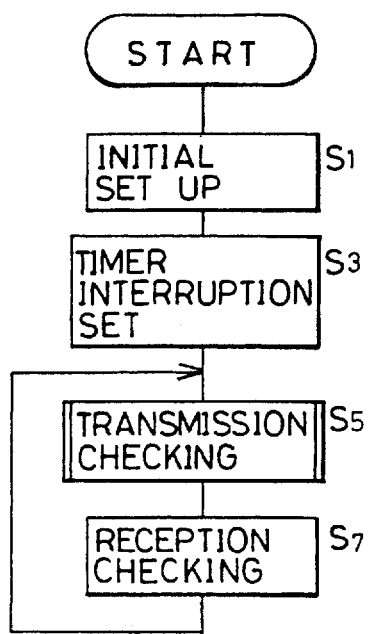
FIG. 6 is a flow chart showing the main routine of the communication control CPU 50 shown in FIG. 3.
Figure 7:
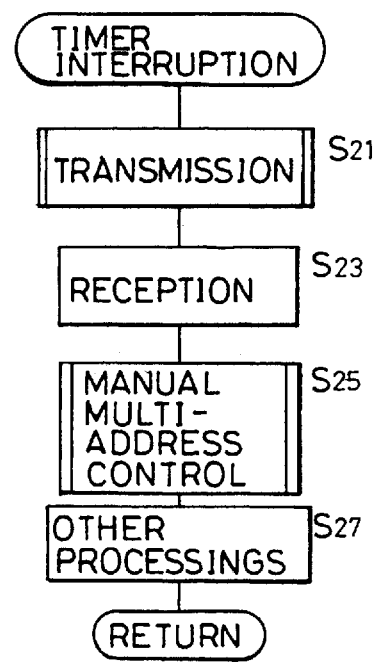
FIG. 7 is a flow chart showing the timer interruption routine in the communication control CPU 50 shown in FIG. 3.
Figure 8A:
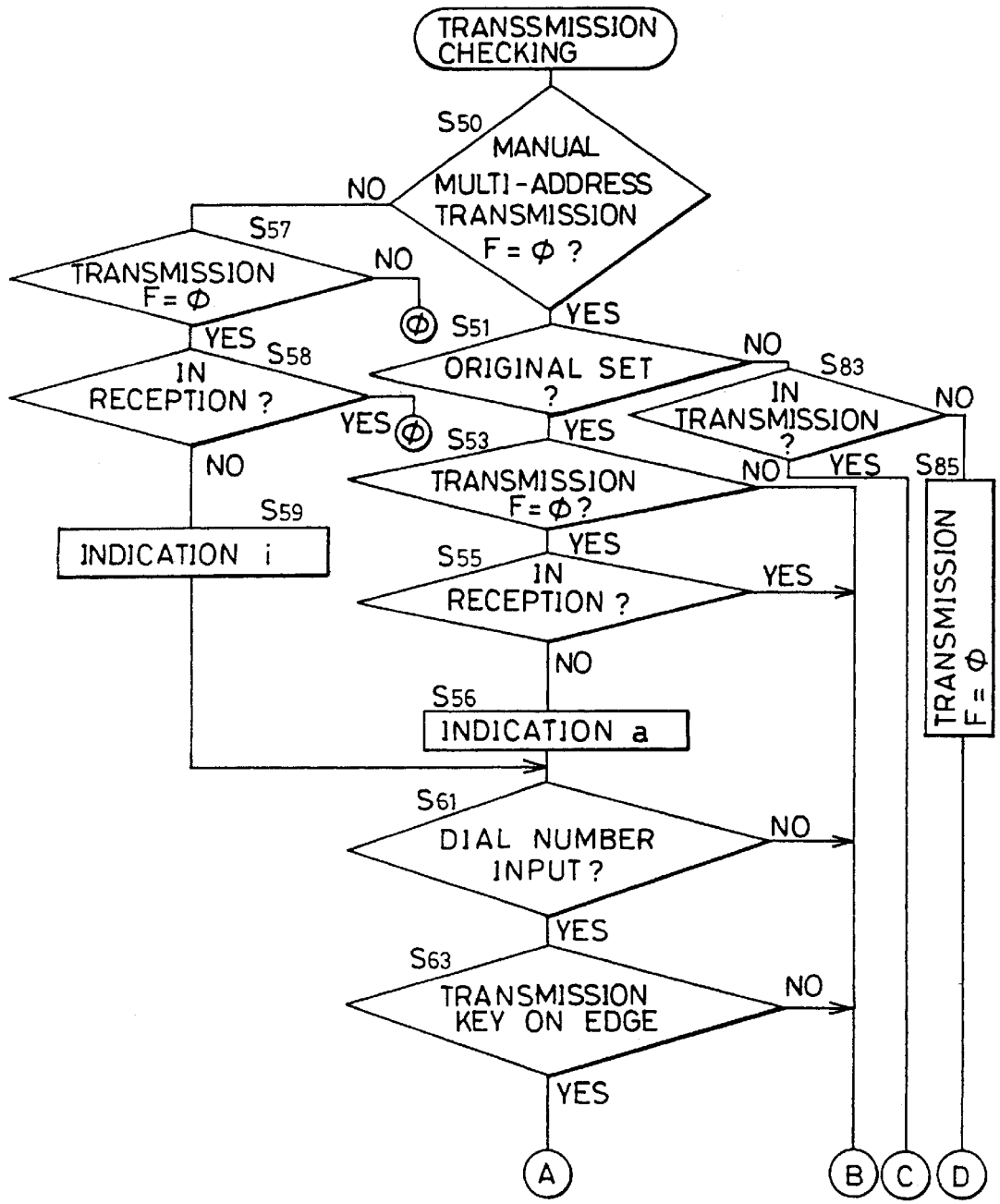
FIGS. 8A to 8D are flow charts each showing the specific contents of transmission checking routine shown in FIG. 6.
Figure 8B:
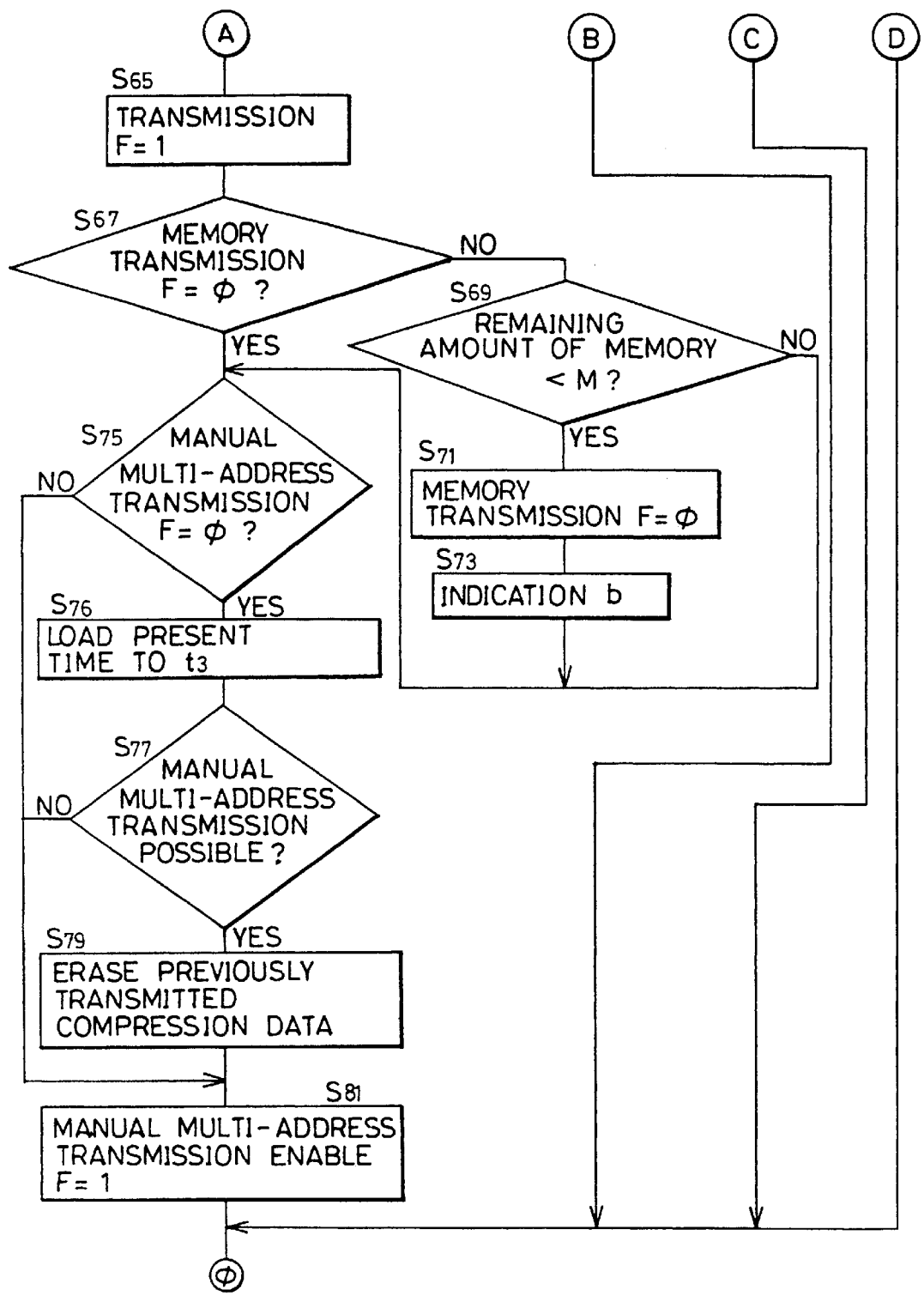
Figure 8C:
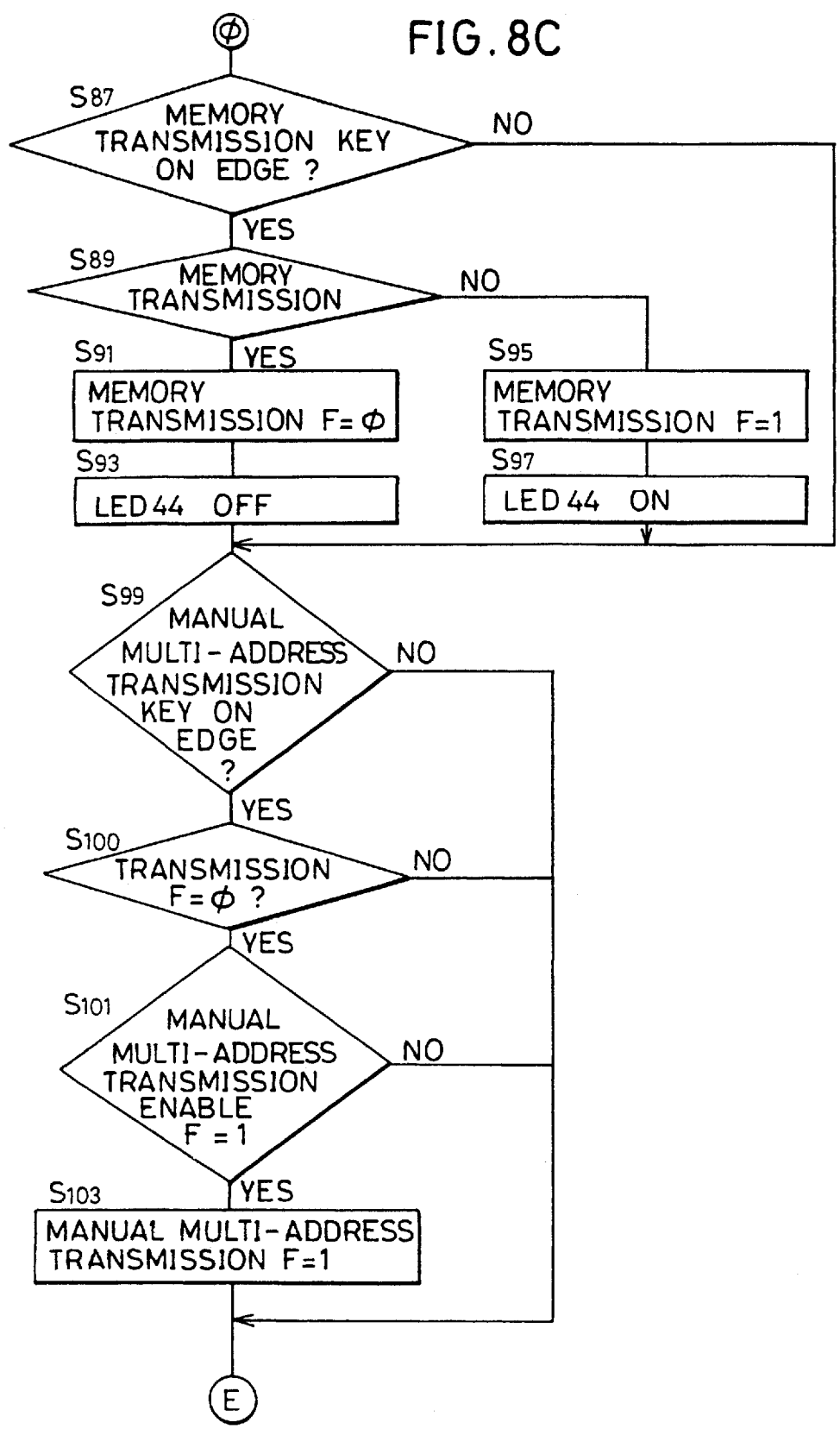
Figure 8D:
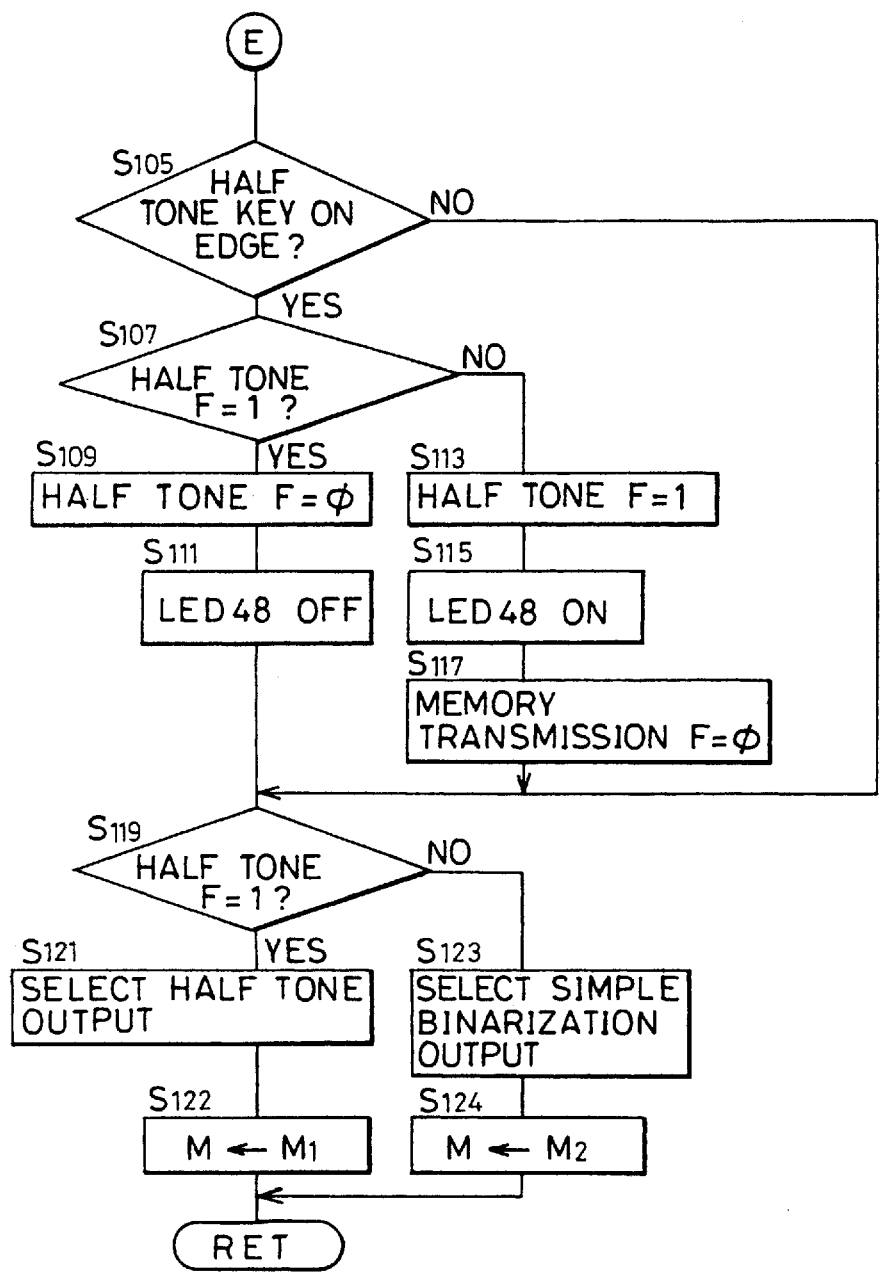

FIGS. 6 and 7 show flow charts for the operations of communication control CPU 50.

In step S1, a register, input/output ports, various flags, etc. are initialized. Next, in step S3, timer interruption is set for periodically calling the interruption service routine shown in FIG. 7.

Steps S5 to S7 are various check routines for executing each sequence of the interruption service routine as desired, for example, for transmitting data upon demand for transmission. When all steps, up to step S7 are completed, the flow returns to step S5 and repeats the same checking procedure.

Transmission checking routine S5 will be described in further detail later; however, reception check routine S7 is a conventional operation by a general apparatus and is not an operation specific to the present invention, and therefore, is not described in detail herein.

FIG. 7 illustrates the service routine for timer interruption, as set in the routine of FIG. 6.

The service routine is formed of three sequences, transmission, reception and manual multi-address control. A detailed description will be provided on step S21 (transmission) and step S25 (manual multi-address control) in conjunction with FIG. 9A and others.

Reception in step S23 is described in the embodiments because it is a conventional operation by a general apparatus; however it is not an operation specific to the present invention, and, therefore, is not described in detail herein.

FIGS. 8A to 8D are flow charts specifically showing the contents of the transmission checking routine of FIG. 6.

In step S50, determination is made as to whether or not manual multi-address transmission is selected. If selected (multi-address transmission flag F=1), the steps subsequent to step S56 will be conducted.

If transmission flag F=0 (YES in step S57), and reception is not going on (NO in step S58), indication i (FIG. 5) is displayed on liquid crystal panel 41, notifying the operator of the time when image data, already transmitted and stored in compression image memory 51, was originally transmitted and of the number of originals transmitted (step S59). The operator can determine the contents of the image data stored in compression image memory 51 by this indication, and can confirm whether or not the stored image data is the image data the operator desires to transmit. The time the image data, stored in compression image memory 51, was originally transmitted is, as will be described later, stored in a storage area $t_3$ in the internal memory of communication control CPU 50. Also, the number of originals is stored in another memory area inside communication control CPU 50 when reading of the transmitted originals is completed. Although in the present embodiment, the time of original transmission of the image data and the number of originals are displayed as information for determining the contents of stored image data, the destination to which the image data was originally transmitted may also be stored for display on liquid crystal panel 41. Furthermore, a part of the stored image data may be converted into dotted data and displayed on liquid crystal panel 41.

Furthermore, this information may be printed out on a sheet of paper by storage portion 1 in response to operation of manual multi-address transmission key 45.

In step S50, if manual multi-address transmission is not selected, detection of the state of the original set is conducted in step S51. When the original is set, the flow proceeds to the steps subsequent to step S56, provided that the facsimile machine is in the state of "ransmission flag F=0" (YES in step S53) and "not receiving" (NO in step S55). "Transmission flag F=1" indicates that transmission is going on in a broad sense including feeding, reading, discharging of an original, etc. When an original is not set, determination is made as to whether or not transmission is going on in step S83. If not, with transmission flag being 0 in step S85, the flow proceeds to step S87 and onward.

Then, the operator is urged by indication a (FIG. 5) to input a dial number. The flow proceeds to step S63 with input of a dial number (YES in S61). If an input (via transmission key 42) is made in step S63, a process for accepting the transmission mode is conducted in step S65 onward. More specifically, the transmission flag F is set to 1 in step S65, and a determination is made, in step S67, as to whether the transmission going on is a memory transmission.

If it is determined to be a memory transmission, the remaining amount of memory is checked in step S69. If "the remaining amount of memory<M" (M is a constant amount) (in other words, the remaining amount of compression image memory 51 is running short), memory transmission is canceled in step S71, and the operator is notified of that information in step S73. Accordingly, the transmission is switched to a non-memory transmission, which utilizes only a small amount of compression image memory 51, when the possibility of compression image memory 51 attaining the state of memory full in the middle of reading information is high (in other words, "the remaining amount of memory<M") based on an estimation.

In this embodiment, the above-described process is executed not only before starting reading operations but also during reading operations around the end of the pages of the originals, which will be described later on.

In steps S75 to S81, memory is checked for manual multi-address transmission.

A determination is made as to whether or not the previous transmission mode was manual multi-address transmission. If not, the present time is stored in a memory area $t_3$ in communication control CPU 50 in step S76. The compression data stored in compression image memory 51, which was transmitted at the time of the previous transmission, is erased in step S79 provided that the transmission going on is a manual multi-address transmission (step S77).

The erasure of the compression image data is not conducted right after the transmission, because it is necessary to prepare for transmission of the previously transmitted compression image data once again if manual multi-address transmission is designated. In step S79, the compression image data previously transmitted for the first time after the operator started transmitting another set of originals.

Manual multi-address transmission enable flag F in step S77 is a flag for indicating whether or not manual multi-address transmission is accepted (or possible). In other words, a determination is made whether image data, which can be transmitted by manual multi-address transmission, is stored in compression image memory 51. It is necessary to hold previously transmitted image data for manual multi-address transmission, but this results in the possibility of usable memory constantly being scarce. If the usable memory is limited, it will be disadvantageous at the time of data reception. Therefore, in the present embodiment, memory is erased after the elapse of a constant time period after completion of reading of an original image or completion of its transmission, thereby preventing usable memory from constantly being scarce.

The possibility that memory erasure, after the elapse of a constant time period, disables use of manual multi-address transmission is substantially low because manual multi-address transmission is usually conducted right after transmission.

In the above-described operation, as will be described later on, erasure of memory is already made (steps S271–S273, S283–S285) if "manual multi-address transmission enable flag F=0", and, therefore, step S79 is omitted, because it is not necessary to erase memory once again.

In step S81, upon input of a new image, manual multi-address transmission enable F is set to 1, thereby permitting acceptance of manual multi-address transmission.

Steps S87 to S124 include sequences to deal with the keys of operation panel 10 in relation with transmission operations.

Switch-on or switch-off of LED 44 is inverted based on a determination as to whether the transmission going on is a memory transmission (steps S89, S91, S93, S95 and S97), thereby indicating the state of transmission by LED 44, provided that memory transmission key 43 is pressed in step S87.

Then, if manual multi-address transmission key 45 is pressed in step S99, manual multi-address transmission is accepted in step S103, provided that transmission is not going on in step S100, and manual multi-address transmission is possible in step S101.

Provided that half-tone key 47 is pressed in S105, switch-on or switch-off of LED 48 is inverted based on a determination as to whether reading in the half-tone mode is going on (steps S109, S111, S113, S115 and S117), thereby indicating the binarization state by LED 48.

The contents of half tone flag F is checked in S119, the switch 75 of FIG. 4 is switched in steps S121 and S123 in accordance with the result of said check. A value M, for checking the remaining amount of memory in step S69 (as described above), is written with $M_1$ or $M_2$ in steps S122 or S124.

$M_1$ and $M_2$ are the amount of compression image data corresponding to a sheet of an original in the cases of half tone mode and binary mode, respectively. As described above, the amount of compression image data for half tone mode is large as compared to the data amount for binary mode, as represented by $M_1 > M_2$.

In this embodiment, non-memory transmission is automatically set when selecting the half-tone mode through operation panel 10 and thereafter, upon selecting of memory transmission, transmission of image data of half-tone mode by memory transmission is conducted. Additionally, the value M for checking the remaining amount of memory is set to a large number for half-tone mode.

Figure 9A:
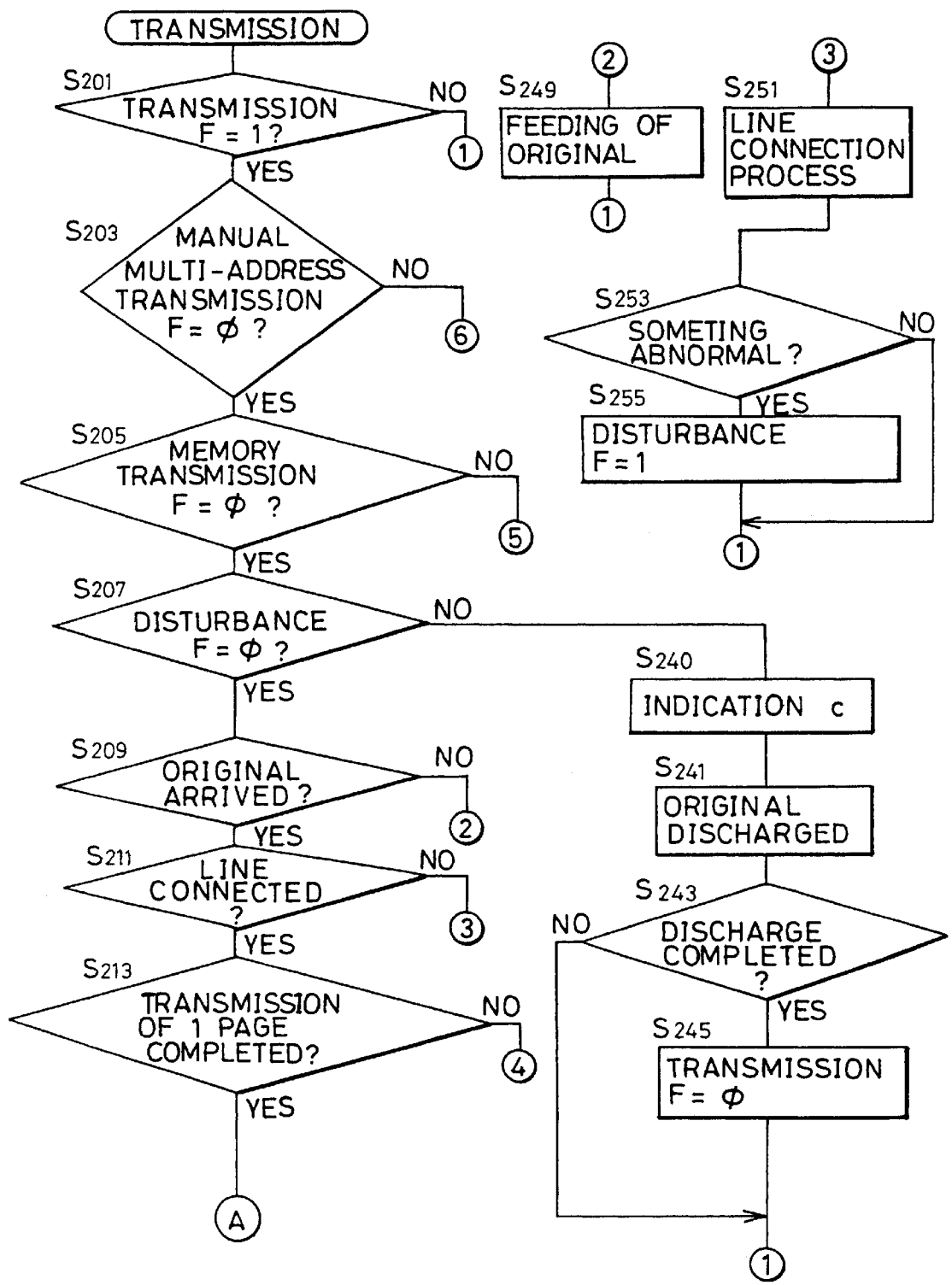
Figure 9B:
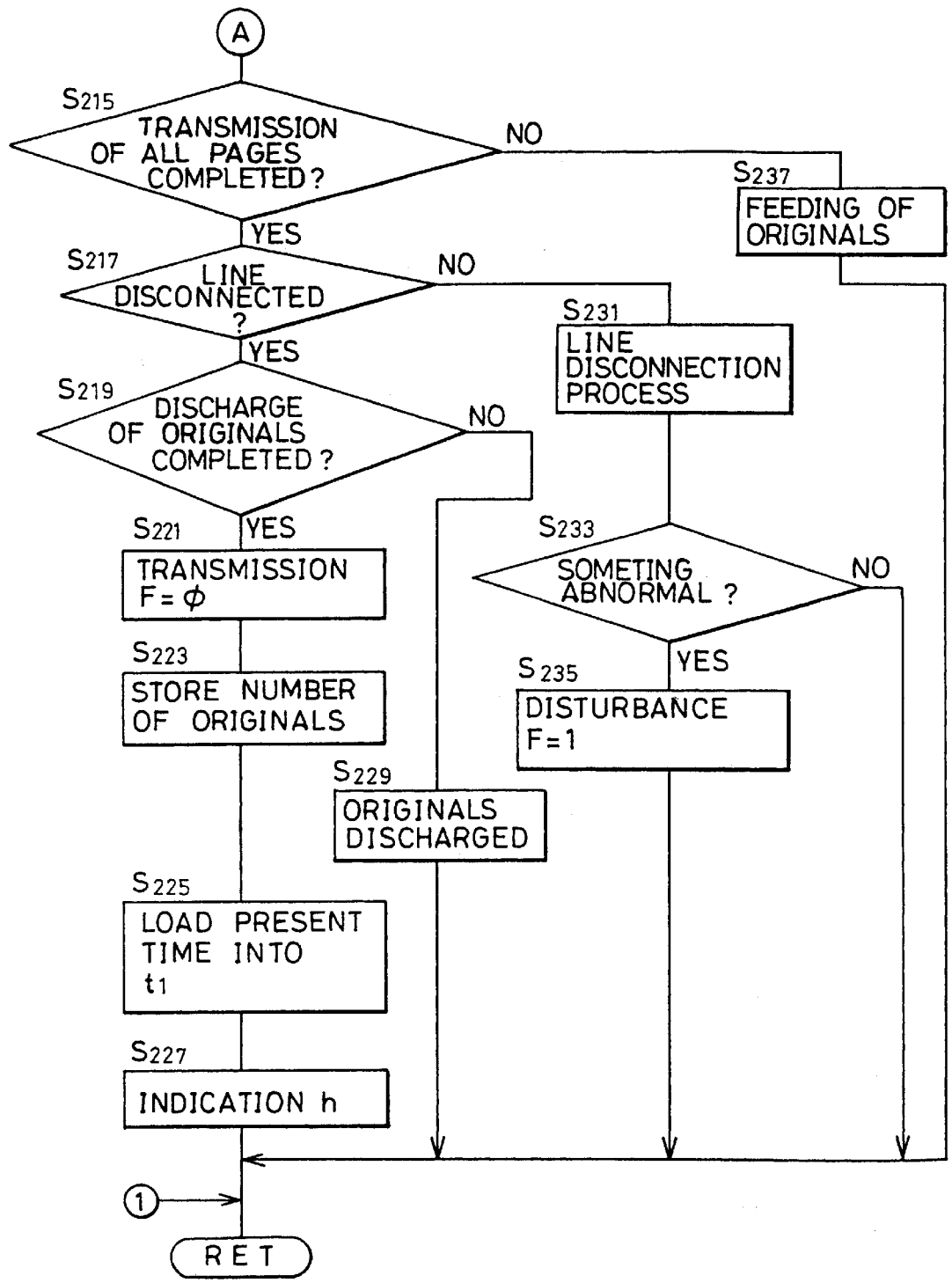
Figure 9C:
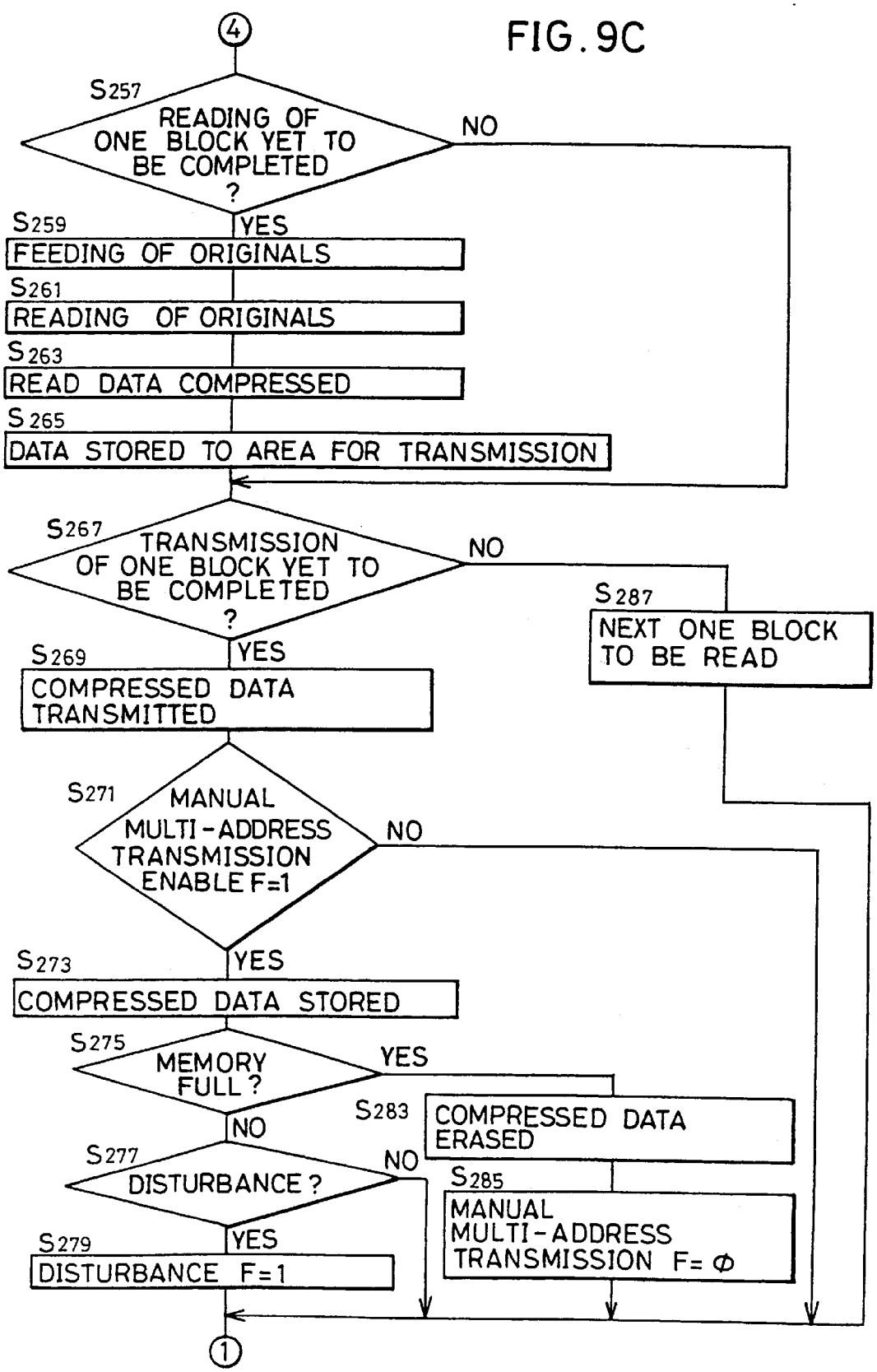

FIGS. 9A to 9F are flow charts each showing the specific contents of transmission processing in step S21. FIGS. 9A to 9C show the steps for non-memory transmission, while FIGS. 9D to 9F show the steps for memory transmission.

If transmission is going on in step S201 and manual multi-address processing is going on in step S203, the flow proceeds to step S341 onward, if the facsimile machine is in the state of memory transmission in step S205 the flow proceeds to step S289 onward, and if in the state of non-memory transmission the flow proceeds to step S207 onward.

Steps after step S207 are for a non-memory transmission, and the steps will be described.

The state of a disturbance flag F is checked in step S207. The disturbance flag is the flag set when troubles on the transmission line caused by degradation in the state of the line, or defects on the receiving side, etc. If the line connection is cut off, the flow proceeds to step S240 onward, with the indication c (FIG. 5) showing this information. Further, the undergoing reading is discharged to discharge tray 29 in step S241, and the transmission flag F is set to zero upon completion of the discharge in step S243 (step S245), thereby stopping the transmission operation.

In steps S209 to S219, it is checked which transmission operation is going on, and the flow path branches into certain steps in accordance with various modes of operation.

Feeding of an original is conducted in step S249 until a preceding original to be read reaches image sensor 28 in step S209.

A line connecting process is performed in step S251 until a line connection is completed in step S211. If some abnormal situation takes place in the line connection in step S253, the disturbance flag F is set to 1 in step S255, thereby proceeding to a stopping process (described hereinbelow).

In step S213 onward, the flow proceeds to the reading of the originals, this process includes in step S257 onward until transmission of one page is completed in step S213. Steps after step S257 will be described later on.

If transmission of all pages is not completed in step S215, transmission of the next original is performed in step S237, while once transmission is completed, the flow proceeds to step S217, thereby starting a line disconnecting process.

The line disconnecting process is conducted in step S231 until it is determined that disconnection of the line is completed in step S217. If it is determined that some abnormal situation takes place in the disconnecting processing in step S233, the disturbance flag F is set, thereby proceeding to a stopping operation.

Finally, discharging of the originals onto discharge tray 29 continues in step S229, until it is determined that the discharging of the originals is completed in step S219.

The transmission flag F is reset in step S221, and the number of the originals is stored in a prescribed storage area of the internal memory of communication control CPU 50. The number of the originals is detected by counting the number of times an original is fed to image sensor 24 in steps S249 and S237. The present time, based on the time indicated in a clock IC 62, is stored in a storage area $t_1$ of the internal memory of communication control CPU 50 in step S225, and after the indication h (FIG. 5) is displayed, the flow returns.

The storage of the present time into storage area $t_1$ in step S225 is for erasing image data stored for the above-described manual multi-address transmission following elapse of a prescribed time period and setting a time to start counting the elapse of time.

Steps S257 to S287 are a flow executing reading and transmission processings of an original of 1 page.

In the present embodiment, these operations are executed by 1 block unit formed of several lines. Reading and transmission of 1 block are started simultaneously, the reading operation is completed before the transmission operation due to the difference in line speeds, and, therefore, the reading system waits at the end of each block.

In step S257, a determination is made as to whether or not reading of one block is completed, and reading operations are conducted from step S259 to S265 until the reading of 1 block is completed. In other words, feeding of an original in step S259, reading of the original in step S261, compression of the read data in step S263, and storing of the compressed data to a transmission area (which corresponds to a part of compression image memory 51 in the present embodiment) in step S265 are conducted.

Then, in step S267, determination is made as to whether or not transmission of 1 block is completed, and transmission of the image data to the line is conducted through steps S269 to S285 until transmission of data for 1 block to the line is completed. More specifically, in step S269, transmission of the compressed data is conducted, and if it is determined that manual multi-address transmission is possible in step S271, compressed data is sequentially stored into compression image memory 51 in step S273, thereby preparing for an upcoming manual multi-address transmission operation.

Steps S275, S283 and S285 are measures taken against memory overflow in the process of memory storage for manual multi-address transmission at the time of a non-memory transmission.

Even with the occurrence of such an overflow situation, only manual multi-address transmission is disabled, and it is therefore not necessary to stop the transmission operation itself. If it is determined that such a memory overflow situation takes place in step S275, the flow proceeds to step S283 onward, erasing the compressed data and resetting the manual multi-address transmission enable flag F. Furthermore, the operator is notified of the fact that manual multi-address transmission is not possible, and this notification is made as a part of manual multi-address control in step S25, on which description will be provided later on.

Figure 5:
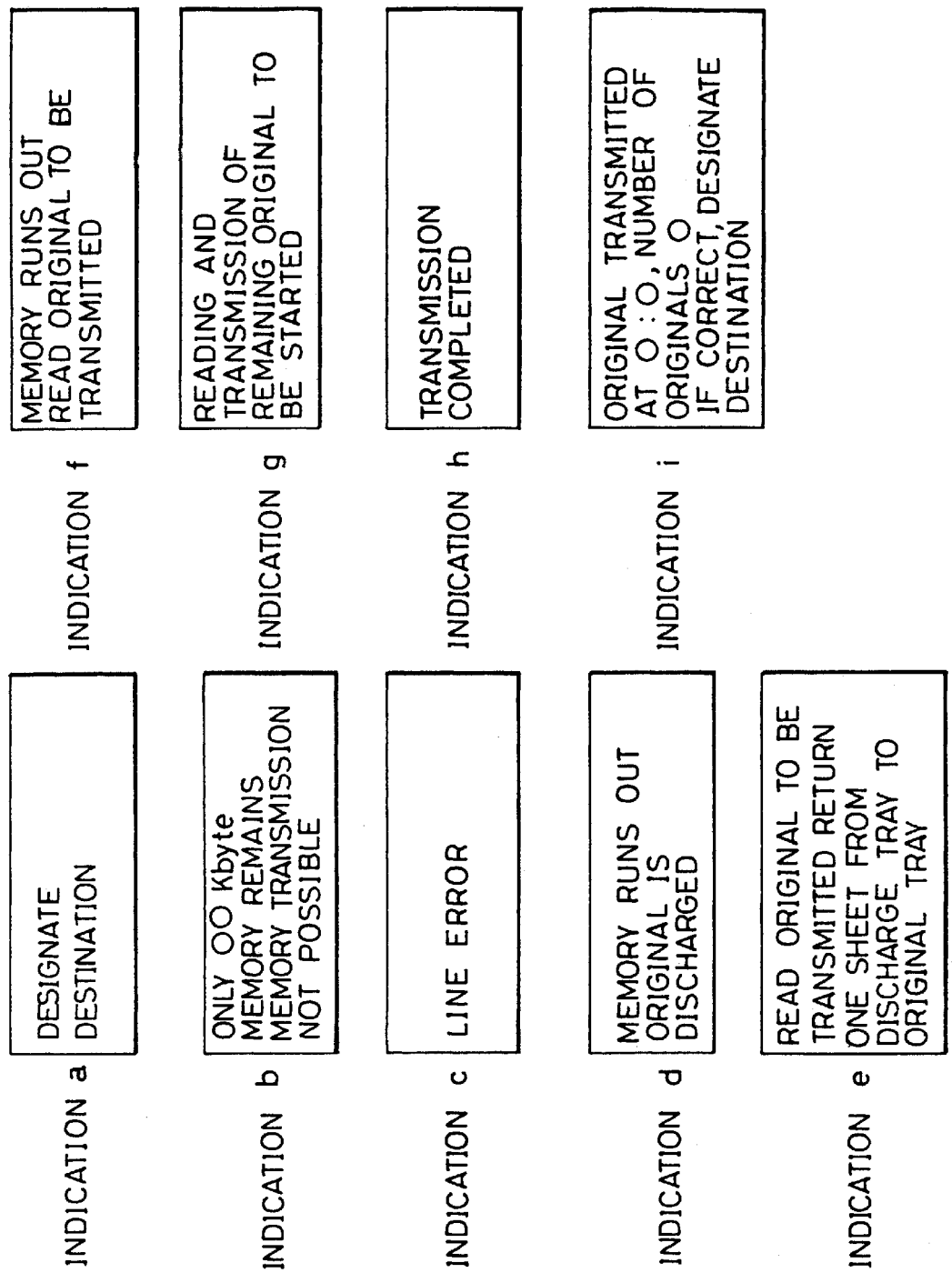
FIG. 5 is a diagram showing the contents displayed at the display portion of the operation panel shown in FIG. 2.

In step S277, a detection is made as to whether the occurrence of a stop of the transmission operation occurred, and if so, the disturbance flag F is set to 1 in step S279. The operator is notified of the line error using indication c (FIG. 5).

Steps S289 to S369 are for a memory transmission. Before getting into description of the steps, measures taken upon the occurrence of a memory full situation at the time of a reading operation for memory transmission will be described.

Image data read for a memory transmission are all compressed and stored in compression image memory 51. The amount of compressed data varies tremendously depending upon the number of originals, the density of the original images, and whether or not reading is conducted at half tone mode. The data sometimes cannot be entirely stored in compression image memory 51. Therefore, the processes represented by (1) to (3) are undertaken:

(1) The remaining amount of memory is checked before a read operation as described above, and if the remaining amount is smaller than a constant amount M, the operation is switched to a non-memory transmission.

(2) Similar checking to (1) is conducted for every page read, and if "the remaining amount of memory<M" holds, the read data is transmitted first, and reading and transmission operations of the remaining originals are conducted thereafter as a non-memory transmission.

(3) Upon the occurrence of a memory overflow situation in the middle of reading, the original undergoing reading is discharged, the already read originals are transmitted first while urging the operator to return the original to original tray 20. Reading and transmission operations of the remaining originals are conducted thereafter. Time required for the operator to return the original to original tray 20 upon the occurrence of a memory overflow situation is sufficiently short as compared to time required for transmitting the read originals. The transmission operation as a whole can be conducted smoothly with this returning operation in between.

Now, description will be provided on the flow.

The memory full flag F and transmission priority flag F are checked in steps S289 and S291. The memory full flag F is a flag set upon the occurrence of a memory full situation (which includes the case of "the remaining amount of memory<M", strictly speaking) and the transmission priority flag F is a flag set when transmission is conducted first upon the memory full situation.

If these flags are not set to 1, the flow proceeds to step S293 onward, checking is made as to which transmission operation is going on at present in steps S293, S295, S301, S303, S341, S343 and S345, and the flow path branches depending upon each transmission operation.

Feeding of the originals is executed in step S331 until the original of the first page reaches the reading position of image sensor 28 in step S293.

Then, reading of the original is executed from step S311 onward until reading of the original of one page is completed in step S295. More specifically, original image data is obtained reading the original by image sensor 24 of close contacting type in step S313 simultaneously with feeding of the original in step S311, the image data is compressed in compression/expansion portion 60 in step S315 and is then stored in compression image memory 51 in step S317. If it is determined in step S319 that compression image memory 51 is filled and reading of that 1 page is not yet completed (YES in S320), the flow proceeds to step S321 onward. Steps from step S321 onward are conducted under the condition that reading of that 1 page is completed, because memory transmission of the original of the page is possible if reading of that one page is completed even in the memory full situation.

The memory full flag F is set to 1 in step S321, and manual multi-address transmission enable flag F is set to 0 in step S323. This is because compressed image data of the original of that one page cannot entirely be stored in the memory at a time under the memory full condition, and manual multi-address transmission operation is not possible.

Then, the compressed image data corresponding to the partially-read original is erased in step S325. The operator is informed of the occurrence of memory full situation display of indication d (FIG. 5).

If reading of the original of one page is completed in step S295 and reading of all pages is not completed (step S301), it is determined whether the remaining amount of memory is larger than a constant amount M or not in step S297. Whether or not reading of the next original is possible without the occurrence of memory full situation can be estimated by this operation. If "the remaining amount of memory≦M", the transmission priority flag F is set to 1 in step S299, feeding of the next original is conducted, giving the indication f of FIG. 5 in step S300 (step S309). If reading of all the pages is completed, the flow path proceeds to step S303, and discharging operation is conducted in step S307 until discharge of the final original to discharge tray 29 is completed. After the completion of said discharge, the number of originals read is stored, and the present time is stored in storage area $t_1$ in step S305. This time is used as a reference for the period of time used for erasing the memory of manual multi-address transmission (described hereinabove).

The flow path proceeds to transmission operations from step S341 onward.

A line connecting process is executed in step S369 until a line connection is completed in step S341. When the connection is completed, transmission of data already stored in image memory 51 is conducted in step S367 until transmission of all the image data is completed.

With transmission of the image data being completed, the memory transmission flag is set to 0 in step S359 when the transmission priority flag F is 1 in step S345, operations switch to non-memory transmission.

This is because if the remaining originals are transmitted by means of memory transmission, there is high possibility of having a memory full situation, and it is not desirable to frequently stop transmission of a part of the originals due to a memory overflow situation.

Then, the transmission priority flag F is reset to 0 in step S361. An operator is informed by the display of indication g (FIG. 5) of that reading and transmission of the remaining originals are to be conducted. Then, disconnection of the line is started. The disconnecting process continues in step S365 until disconnection of the line is completed in step S347.

Now, description will be provided on the case in which the memory full situation takes place at the time of storing the compressed data in step S317.

In this case, the flow path proceeds from step S289 to step S333, and the original being read is discharged to discharge tray 29 until the discharge is completed in step S344. Upon completion of the discharge of the original, the memory full flag F is returned to 0 in step S335, and the operator is notified, by display of indication e (FIG. 5), that the original image previously read is transmitted. Furthermore, the indication requests the operator to return one sheet of the originals (the original which caused the memory full situation) from the discharge tray 29 to the original tray 20. The transmission priority flag F is set to 1 in step S339.

After the transmission priority flag F is set to 1, the flow proceeds from step S291 to step S341 onward, getting into transmission of data to the transmission line. When the transmission of data to the transmission line is completed, the flow proceeds from step S347 to step S365, initiating a transmission line disconnecting process.

Steps S345 to S357 are undertaken in the case the transmission is completed without the occurrence of a memory full situation.

The transmission flag F is set to 0 in step S319, the flow proceeds from step S351 to step S353 only if the next transmission is manual multi-address transmission, setting the manual multi-address transmission flag F to 0. Then an operator is notified of the completion of the transmission by display of indication h (FIG. 5) in step S357, thereby completing the transmission operation.

Figure 10:
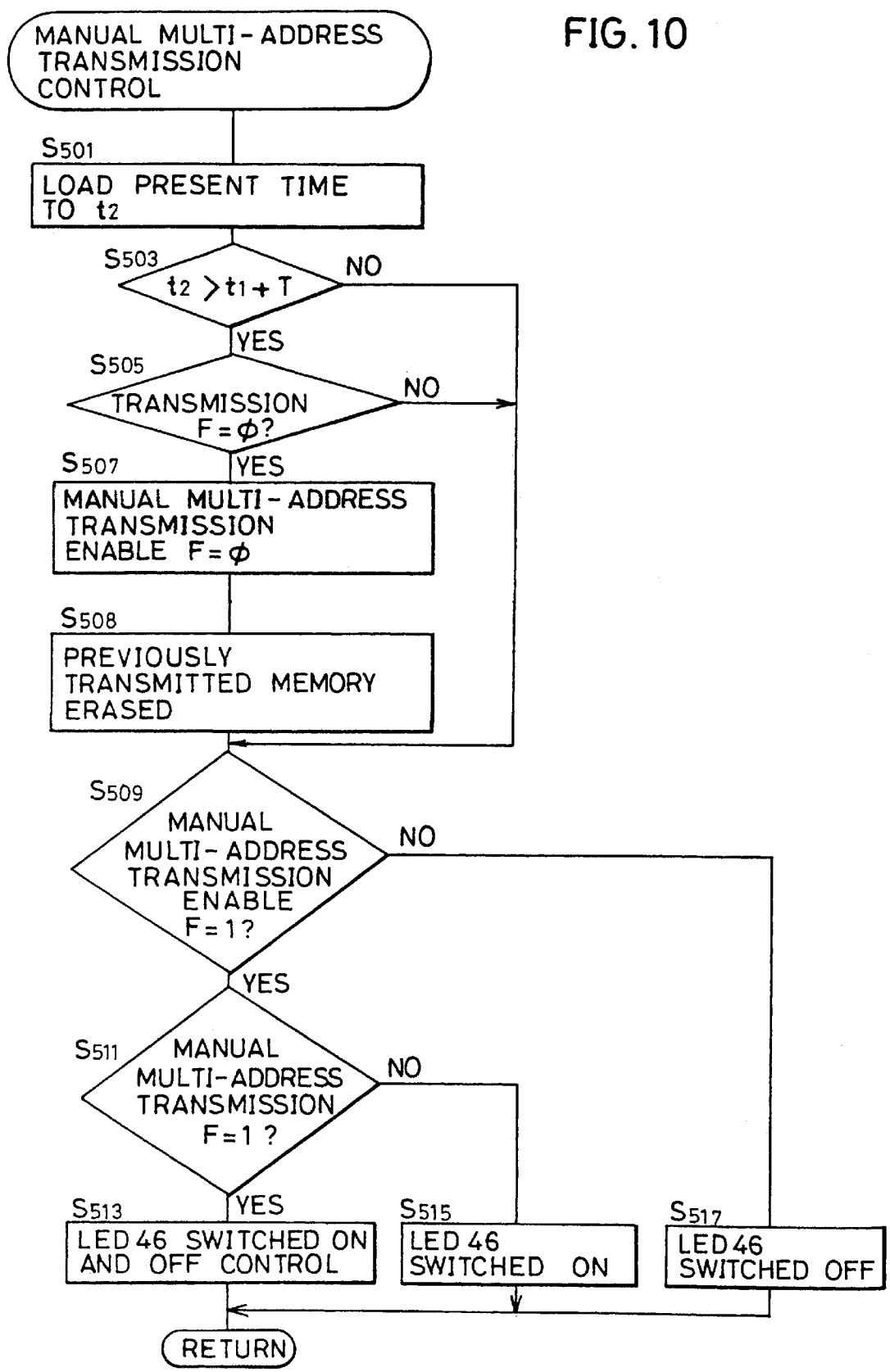
FIG. 10 is a flow chart showing the specific contents of the manual multi-address control routine shown in FIG. 7.

FIG. 10 is a flow chart showing the specific contents of manual multi-address transmission control in which the data of image memory for manual multi-address transmission is erased after the elapse of a prescribed time period from the previous transmission.

Time counting for this erasure operation is started at the following timings:

(1) When transmission is completed in the case in which the previous transmission is non-memory transmission (line disconnecting).

(2) When reading of originals is completed in the case in which the previous transmission is memory transmission.

(3) When transmission is completed in the case in which the previous transmission is manual multi address transmission (line disconnecting).

The counting time start time has been already stored in the storage area t₁ in the above-described flow. The present time is stored in storage area t₂ in step S501. In step S503, if time stored in storage area t₂ is T time period or longer elapsed from the time stored in storage area t₁, and the machine is not in the state of transmission in step S505, the manual multi-address transmission enable flag F is set to 0 in step S507, disabling acceptance of manual multi-address transmission, and the data of memory previously transmitted is erased in step S508.

Although the value T is set to time around when the operator has conducted operations associated with transmission, leave from the facsimile machine, and manual-address transmission will not be conducted any longer, the other factors may be taken into account.

However, it is desirable that the operator can determine if erasure of memory due to the time set as described above, or inhibition of the acceptance of manual multi-address transmission due to the situation of the above-described memory overflow are conducted.

LED 46 is therefore used for the following purposes, giving the operator information associated with manual-address transmission:

(1) LED 16 is switched on and off when manual multi-address transmission is going on.
(2) LED 46 is switched on if manual multi address transmission is possible.
(3) LED 46 is switched off if manual multi-address transmission is not possible.

A flow executing the above-described processings from step S509 onward will be described.

If it is determined that manual multi-address transmission is not possible in step S509, LED 46 is turned off in step S517. Furthermore, if manual multi-address transmission is possible and it is determined in step S511 that the device is not presently executing manual multi-address transmission, LED 46 is switched on in step S515. Then, if it is determined in step S511 that manual multi-address calling is going on, LED 46 is switched on and off in step S513.

In the above-described embodiment, a method of switching from memory transmission to non-memory transmission during retrieving operations has been described when the remaining amount of memory is scarce, two other embodiments are possible and description will be provided on these embodiments.

Figure 11:
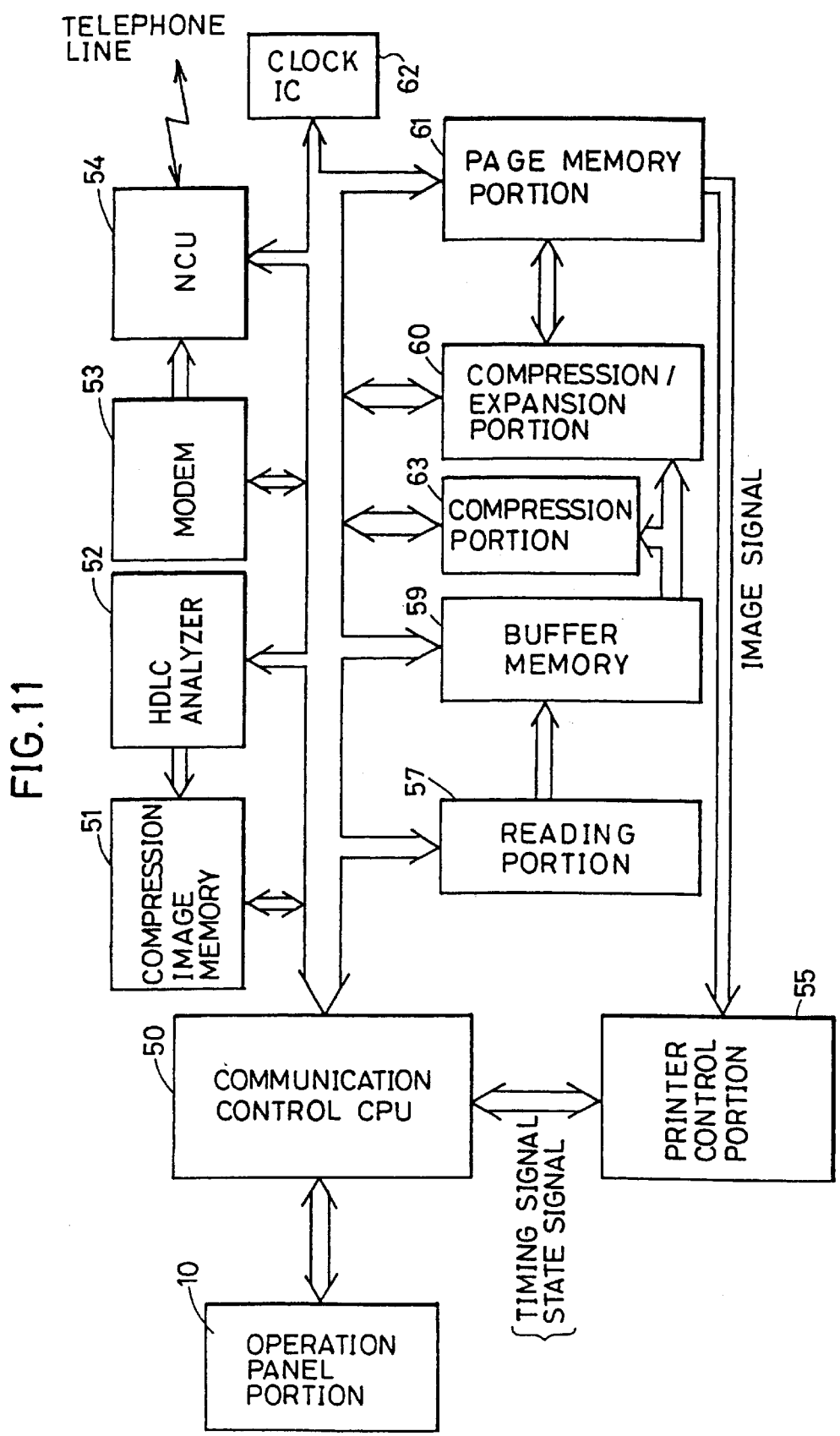
FIG. 11 is a block diagram showing the control portion of a facsimile machine in accordance with another embodiment of the present invention.

A first embodiment for copying with the scarcity of the remaining memory during memory transmission A facsimile machine, which is structured by a block diagram in FIG. 11 in place of the block diagram of FIG. 3 is to be considered. The facsimile machine is different from the machine shown in FIG. 3 in provision of another compression portion 63 having a compression function other than compression/expansion portion 60. Compression portion 63 is used to compress image data read by reading portion 57 while compression/expansion portion 60 is used for expansion/re-compression operations for the time of memory transmissions. In other words, at the time of a memory transmission, a transmission operation (strictly speaking, transmission to the transmission line) and a reading operation of an image can be performed in parallel.

Figure 12A:
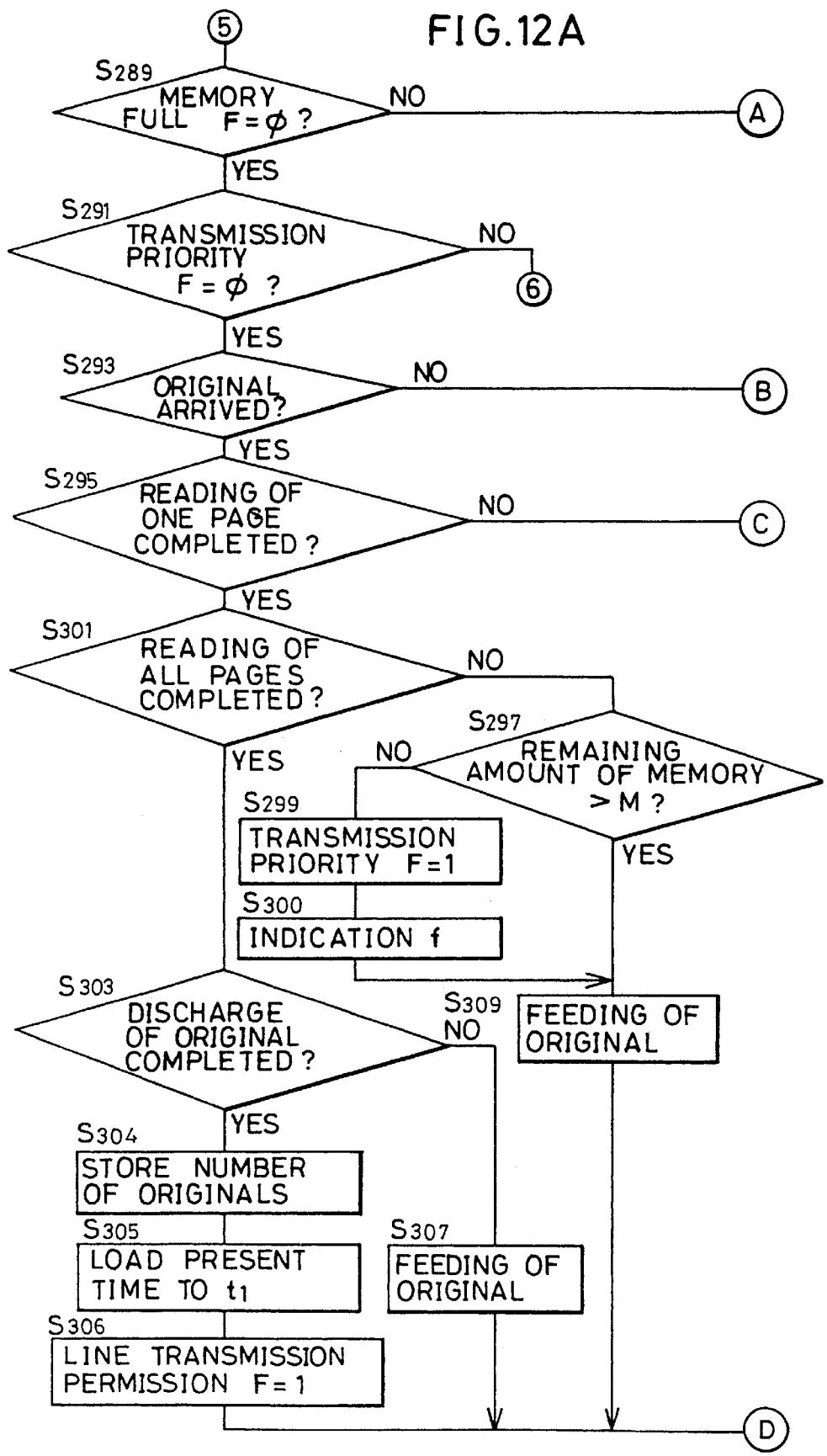
FIGS. 12A to 12B are flow charts each showing the embodiment shown in FIG. 11, corresponding to FIGS. 9D to 9E showing the former embodiment.
Figure 12B:
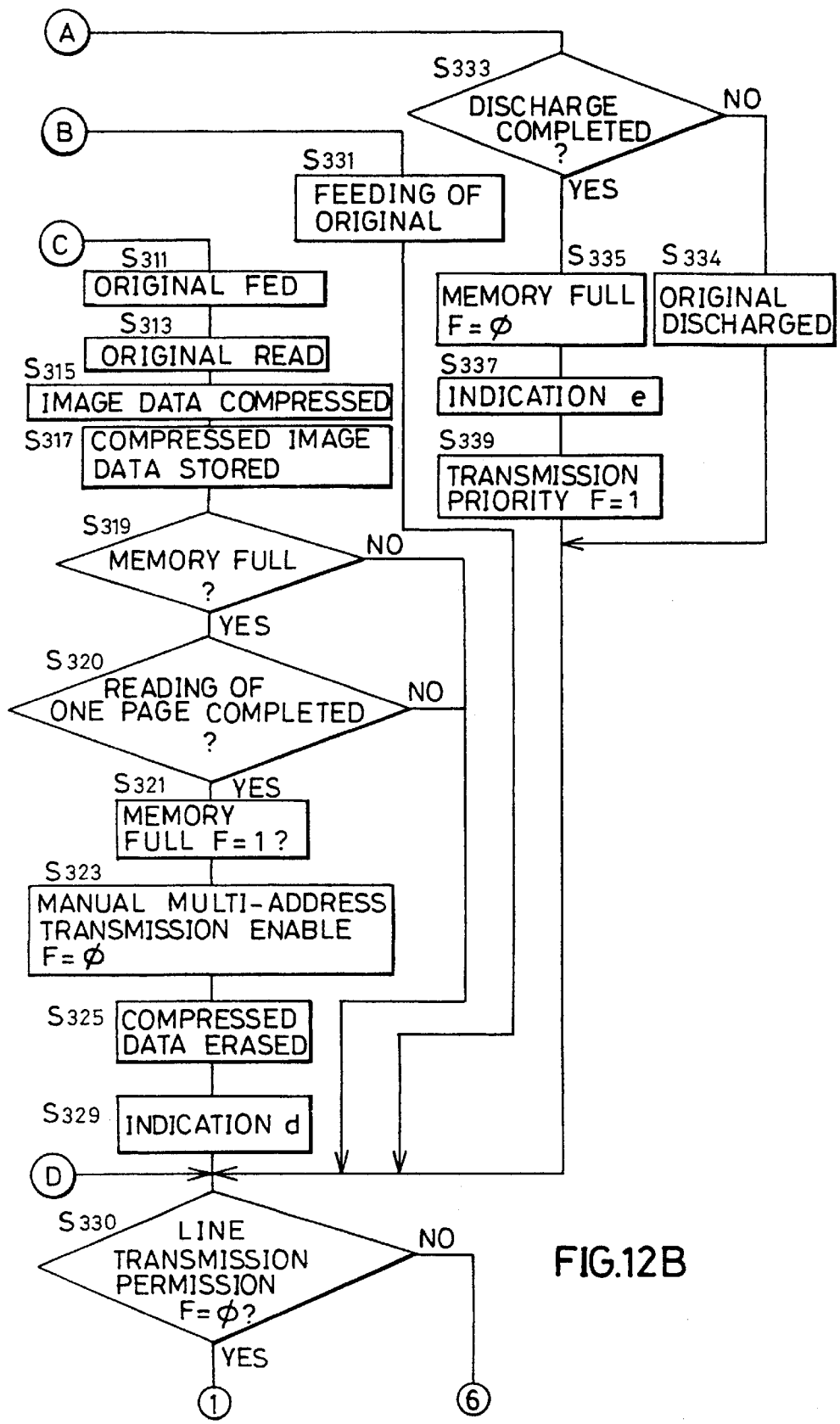

Thus, reading of the originals which have not yet been read can be resumed without waiting for completion of the transmission of the already read images due to the lack of the remaining memory or the memory for situation. Furthermore, switching from memory transmission, to non-memory transmission which was necessary, will not be required. More specifically, transmission of image data to the transmission line proceeds, and when the vacant space of compression image memory 51 is enough, reading of the original is resumed. This embodiment is implemented by flow charts shown in FIGS. 12A, 12B and 13 in place of FIGS. 9D, 9E and 9F. A major difference from FIGS. 9D, 9E and 9F is provision of a line transmission permission flag F as shown in steps S306, S330, and S350, and that reading and transmission to the line are permitted simultaneously at the time of memory transmission. If of course the remaining amount of memory is not scarce, this simultaneous operations of transmission and reading will not be performed depending upon the determination made in step S330. Another difference is provision of steps S368 and S370, whereby the remaining amount of memory is checked at the time of data transmission to the transmission line, and if the remaining amount is enough, the transmission priority mode is canceled in step S370. Thereafter reading and transmission to the line are simultaneously conducted due to this processing.

A second embodiment for coping with the lack of the remaining amount of memory during memory transmission In a facsimile machine structured as shown in the block diagram of FIG. 3, memory transmission may be maintained as in the case with the previous first embodiment even if the memory overflow situation takes place.

In this case, once transmission of read image data is completed, CPU 50 controls NCU 54 to make connection to the transmission line. CPU 50 stores the destination, and controls NCU 54 to resume transmission line connection operation to the stored destination, after the reading operation of the remaining original images is completed. Memory transmission of the remaining originals is conducted some time later. As described above, all the originals are transmitted by means of memory transmission, and, therefore, in the transmission of the remaining originals, the operator can taken home with him/her the already read originals. The operator can therefore be advantageously released from the facsimile machine sooner.

In the former embodiment, erasure of data in the memory is conducted after the elapse of a constant time period for the purpose of increasing the capacity of the memory at the time of a manual multi-address transmission. However, the real advantage of this erasure operation of the memory is demonstrated in a reception operation in the facsimile machine. This is because in usual transmission operations, data in a memory for manual multi-address transmission has been already erased prior to reading of a new original.

Two kinds of approaches for increasing the capacity of the memory just for transmission operation will be described.

A first embodiment related to data erasure

Figure 14:
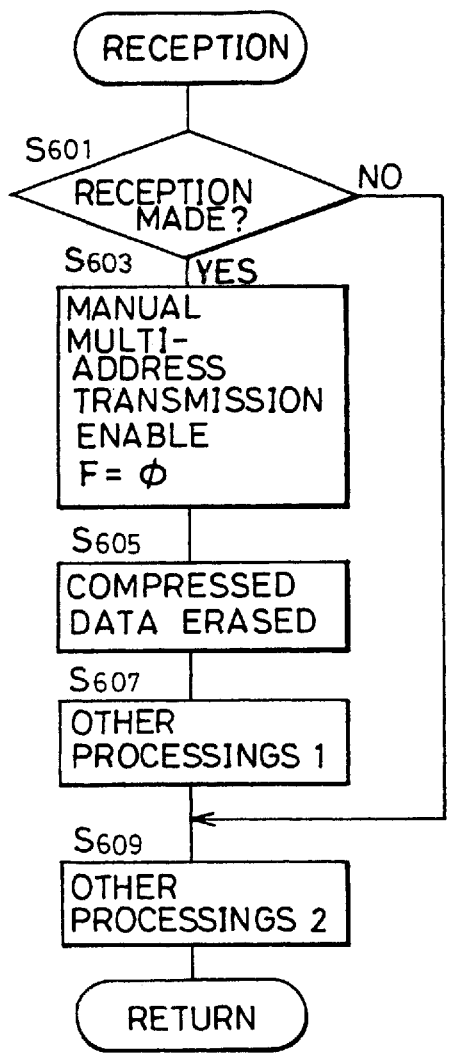
FIG. 14 is a flow chart showing the specific contents of a reception routine in accordance with yet another embodiment of the present invention.

Upon reception, data in a memory for manual-address transmission is erased for the first time. In other words, as shown in FIG. 14, when reception is made in step S601, data in the memory for manual multi-address transmission is erased by executing the steps of steps S603 and S605, thereby emptying the memory for storage of received image data.

A second embodiment related to data erasure

Figure 15:
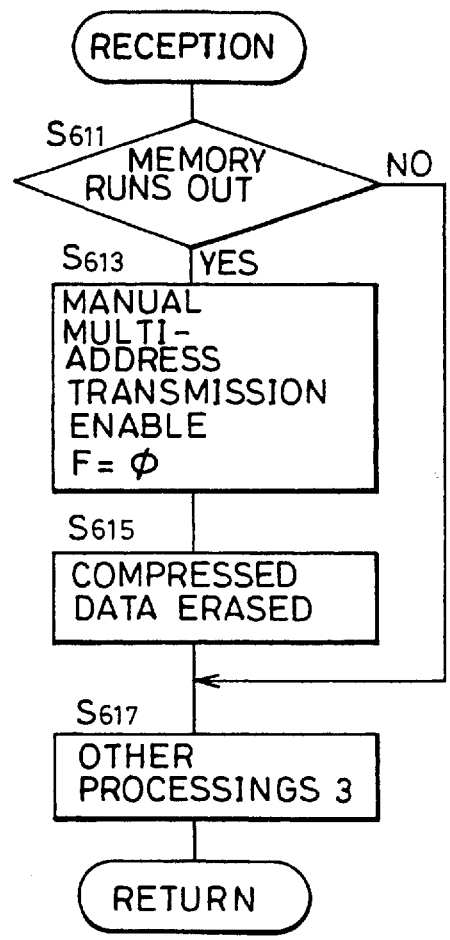
FIG. 15 is a flow chart showing the specific contents of a reception routine in accordance with a still further embodiment of the present invention.

Erasure is performed when the memory remaining amount runs out due to reception. In other words as shown in FIG. 15, the remaining amount of memory is monitored in step S611, and data in a memory for manual multi-address transmission is erased by executing process in steps S613 and S615 when the remaining amount of memory becomes scarce, thereby emptying the memory for storage of reception image data.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A facsimile machine comprising:
   initiation means for initiating a facsimile transmission;
   reading means for reading an original image to be transmitted;
   storage means for storing said read image data;
   detection means for detecting whether or not a remaining amount of storage capacity of said storage means agrees with a prescribed value responsive to an output of said initiation means;
   first transmission means for transmitting said stored image data to an external device after the reading operation by said reading means is completed;
   second transmission means for transmitting the read image data to an external device in parallel with the reading operation by said reading means; and
   control means for automatically activating one of said first and second transmission means responsive to an output from said detection means.

2. A facsimile machine as recited in claim 1, wherein said control means activates said second transmission means when the remaining amount of the storage capacity of said storage means is below a prescribed reference value.

3. A facsimile machine as recited in claim 2 further comprising:
   first data processing means for simple-binarizing said read image data and outputting the same;
   second data processing means for outputting said read image data as density data capable of expressing half tone; and
   selection means for selecting one of said first and second data processing means, wherein
      said control means sets said reference value to be a prescribed first value when said first data processing means is selected by said selection means, and to be a second value larger than said first value when said second processing means is selected by said selection means, and controls said first or second transmission means so that image data output from the first or second data processing means selected by said selection means is transmitted.

4. A facsimile machine as recited in claim 3, wherein said second processing means binarizes said read image data by areal gradation method.

5. A facsimile machine as recited in claim 3, wherein said second data processing means binarizes said read image data by dither method.

6. A facsimile machine as recited in claim 3, wherein said second data processing means binarizes said read image data by error dispersion method.

7. A facsimile machine as recited in claim 3, wherein said second data processing means outputs said read image data as multi-value data.

8. A facsimile machine as recited in claim 1, wherein said first and second transmission means transmit said read image data through a telephone line.

9. A facsimile machine as recited in claim 1, wherein said control means also activates said reading means in response to the output of said initiation means.

10. A facsimile machine including reading means for sequentially reading a plurality of original images to be transmitted and storage means for storing said read image data, having a memory transmission mode in which said stored image data is transmitted and a non-memory transmission mode in which said read image data is transmitted without being stored in said storage means, the facsimile machine comprising:
    detection means for detecting whether or not a remaining amount of storage capacity of said storage means comes to a prescribed value; and
    control means for automatically switching the transmission mode of said facsimile machine from said memory transmission mode to said non-memory transmission mode when said detection means detects that the remaining amount of storage capacity of said storage means comes to the prescribed value.

11. A facsimile machine as recited in claim 10, wherein said detection means is activated every time reading of one sheet of original is performed by said reading means.

12. A facsimile machine including reading means for reading an original image to be transmitted, storage means for storing read image data, and transmission means for transmitting said read image data, wherein
    said transmission means is capable of operating in a memory transmission mode in which said stored image data is transmitted, and in a non-memory transmission mode in which said read image data is transmitted without being stored in said storage means,
    the machine comprising:
       mode selection operating means which can be operated by an operator;
       detection means for detecting whether or not the remaining amount of the storage capacity of said storage means is below a prescribed value; and
       control means for automatically setting the transmission mode of said facsimile machine to said memory transmission mode or said non-memory transmission mode in response to the operation of said mode selection operating means, and
       for automatically inhibiting the initiation of transmission operation of said transmission means in said memory transmission mode when said detection means detects that the remaining amount of the storage capacity of said storage means is below said prescribed value.

13. A facsimile machine as recited in claim 12, wherein said control means controls said transmission means to transmit image data already stored in said storage means, when the detection by said detection means is made during reading operation of an original image in said memory transmission mode, and set the transmission of said facsimile machine to said non-memory transmission mode in response to completion of the transmission mode of said stored image data.

14. A facsimile machine comprising:
    reading means for sequentially reading a plurality of original images to be transmitted;
    storage means for storing read image data;
    detection means for detecting that a remaining amount of storage capacity of said storage means is below a prescribed value;
    first transmission means for automatically transmitting said stored image data to an external device in response to a detection output of said detection means; and
    second transmission means for automatically transmitting image data, corresponding to original images yet to be transmitted to an external device without using said storage means after the transmission of said stored image data by said first transmission means.

15. A facsimile machine as recited in claim 14, further comprising:

control means for interrupting the operation of said reading means when said detection means detects that the remaining amount of the storage capacity of said storage means is below the prescribed value and for resuming the operation of said reading means after the transmission of said stored image data by said first transmission means.

16. A facsimile machine including reading means for sequentially reading a plurality of original images to be transmitted, storage means for storing read image data, and transmission means for transmitting said read image data to an external device, wherein said transmission means is capable of operating in a memory transmission mode in which stored image data is transmitted, and in a non-memory transmission mode in which the image data read by said reading means is transmitted without being stored in said storage means, the facsimile machine comprising:

detection means for detecting whether or not a remaining amount of storage capacity of said storage means comes to a prescribed value; and control means for controlling said transmission means so that before detecting the remaining amount of storage capacity is equal to or less than the prescribed value image data read is automatically transmitted in said memory transmission mode and upon such detection image data read is automatically transmitted in said non-memory transmission mode.

17. A facsimile machine comprising:

reading means for sequentially reading a plurality of original images to be transmitted;

storage means for storing read image data;

transmission means for transmitting read image data to an external device;

detection means for detecting whether or not a remaining amount of storage capacity of said storage means comes to a prescribed value; and control means for controlling said reading means and said transmission means so that operation of said reading means is interrupted and transmission of image data already stored in said storage means is automatically started when said detection means detects that the remaining amount of the storage capacity of said storage means comes to the prescribed value during the reading operation of said plurality of original images by said reading means, and the operation of said reading means is automatically resumed after completion of the transmission of said all stored image data.

18. A facsimile machine as recited in claim 17, wherein said control means controls said transmission means so that image data read after the operation of said reading means is resumed is transmitted without being stored in said storage means.

19. A facsimile machine as recited in claim 17, wherein said control means controls said storage means and said transmission means so that the image data read after the operation of said reading means is resumed is read out from said storage means to be transmitted after being stored in said storage means.

20. A facsimile machine as recited in claim 19, wherein said transmission means includes line connection control means for connecting a communication line for transmission to a destination of an external device to which said read image data is to be transmitted, and destination storage means for storing said destination, said line connection control means disconnects said communication line in response to completion of transmission of all the image data read before the detection by said detection means, and re-connects said communication line for transmitting said read image data to the destination stored in said destination storage means in response to completion of storage to said storage means of the image data read after resumption of the operation of said reading means.

21. A facsimile machine comprising:

reading means for reading an original image;

an original tray on which a plurality of originals holding images to be transmitted are placed;

feeding means for sequentially feeding said plurality of originals placed on said original tray to said reading means;

discharging means for discharging an original the image of which has been read by said reading means;

storage means for storing image data read by said reading means;

transmission means for transmitting said image data to an external device;

detection means for detecting whether or not a remaining amount of the storage capacity of said storage means comes to a prescribed value;

first control means, when said detection means detects that the remaining amount of the storage capacity of said storage means comes to the prescribed value during a reading operation of the image of one sheet of said plurality of originals by said reading means, for controlling said discharging means to discharge said original being read, for controlling said feeding means and said reading means to stop feeding and reading operations of subsequent originals, respectively, and for controlling said transmission means to resume transmission of image data corresponding to originals already read and stored in said storage means; and indication means for making a predetermined indication to an operator when the detection is made by said detection means that the remaining amount of the storage capacity of said storage means comes to the prescribed value during the reading operation of the image of one sheet of said plurality of originals by said reading means.

22. A facsimile machine as recited in claim 21 further comprising:

second control means for controlling said feeding means and said reading means so that reading of the image of the original remaining on said original tray is resumed after completion of the transmission of the image data stored in said storage means.

23. A facsimile machine comprising:

a reading means for sequentially reading a plurality of original images to be transmitted;

a first compression portion for compressing said read image data by a first compression format;

storage means for storing the image data compressed by said compression portion;

a second compression portion and expansion portion for expanding image data read out from said storage means and for compressing the expanded image data by a second compression format, said second compression portion and expansion portion being capable of operation in parallel with the compression operation of said first compression portion;

transmission means for transmitting the image data compressed by said second compression portion and expansion portion to an external device;

detection means for detecting the remaining amount of the storage capacity of said storage means; and control means for controlling said second compression portion and expansion portion and said transmission means so that transmission of image data already stored in said storage means is initiated when the detection is made by said detection means that the remaining amount of the storage capacity of said storage means comes to a prescribed value during the reading operation of said plurality of original images by said reading means, and for controlling said reading means and said first compression portion to operate in parallel with the compression operation by said second compression portion and expansion portion and the transmission operation by said transmission means based on a detection by said detection means.

24. A facsimile machine comprising:

initiation means for initiating the transmission operation of the facsimile machine;

reading means for reading plural original images to be transmitted;

storage means for storing said plural read image data;

detection means for detecting whether or not a remaining amount of storage capacity of said storage means agrees with a reference value;

first transmission means for transmitting said stored image data of the plural original images to an external device after the reading operation by said reading means is completed;

second transmission means for activating said reading means and for transmitting the read image data to an external device in parallel with the reading operation by said reading means; and control means for automatically activating one of said first and second transmission means based on the result of said detection means in response to an output of said initiation means.

25. A facsimile machine as recited in claim 24, wherein said control means activates said second transmission means when the remaining amount of the storage capacity of said storage means is below the reference value.

26. A facsimile machine as recited in claim 24, wherein said first and second transmission means transmit said read image data through a telephone line.

27. A facsimile machine as recited in claim 24, wherein said control means also activates said reading means in response to the output of said initiation means.

* * * * *